(12) United States Patent
Miller et al.

(10) Patent No.: US 7,930,416 B2
(45) Date of Patent: *Apr. 19, 2011

(54) LOAD BALANCING TECHNIQUE IMPLEMENTED IN A DATA NETWORK DEVICE UTILIZING A DATA CACHE

(75) Inventors: Andrew Karl Miller, Los Altos, CA (US); Jack Dee Menendez, Mountain View, CA (US); Ajit Ramachandra Mayya, Saratoga, CA (US)

(73) Assignee: IPVenture, Inc., Los Altos, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/322,745

(22) Filed: Feb. 7, 2009

(65) Prior Publication Data

US 2009/0150534 A1 Jun. 11, 2009

Related U.S. Application Data

(63) Continuation of application No. 11/191,413, filed on Jul. 27, 2005, now Pat. No. 7,509,407, which is a continuation of application No. 09/568,823, filed on May 10, 2000, now Pat. No. 7,197,547.

(60) Provisional application No. 60/133,646, filed on May 11, 1999.

(51) Int. Cl.
*G06F 15/16* (2006.01)
(52) U.S. Cl. ........ 709/229; 709/223; 709/224; 709/105; 718/105; 705/26; 705/27
(58) Field of Classification Search ................... 709/223, 709/224, 227, 229; 705/26, 27; 718/105
See application file for complete search history.

(56) References Cited

U.S. PATENT DOCUMENTS 2,781,643 A 2/1957 Fairweather
(Continued)

FOREIGN PATENT DOCUMENTS

EP 0 425 405 A2 5/1991
(Continued)

OTHER PUBLICATIONS

U. S. Appl. No. 11/818,010, filed Jun. 13, 2007.
(Continued)

*Primary Examiner* — Barbara N Burgess

(57) ABSTRACT

Techniques for implementing a load balanced server system are described which may be used for effecting electronic commerce over a data network. The system comprises a load balancing system and a plurality of servers in communication with the load balancing system. Each of the plurality of servers may include a respective data cache for storing state information relating to client session transactions conducted between the server and a particular client. The load balancing system can be configured to select, using a load balancing protocol, an available first server from the plurality of servers to process an initial packet received from a source device such as, for example, a client machine of a customer. The load balancing system can also configured to route subsequent packets received from the source device to the first server. Before generating its response, the first server may verify that the state information relating to a specific client session stored in the data cache is up-to-date. If the first server determines that the state information stored in the data cache is not up-to-date, then the first server may be configured to retrieve the desired up-to-date state information from a database which is configured to store all state information relating to client sessions which have been initiated with the server system.

34 Claims, 9 Drawing Sheets

U.S. PATENT DOCUMENTS

| | | |
|---|---|---|
| 3,406,532 A | 10/1968 | Rownd et al. |
| 3,670,867 A | 6/1972 | Traube |
| 4,213,310 A | 7/1980 | Buss |
| 4,530,067 A | 7/1985 | Dorr |
| 4,656,591 A | 4/1987 | Goldberg |
| 4,799,156 A | 1/1989 | Shavit et al. |
| 4,803,348 A | 2/1989 | Lohrey et al. |
| 4,823,984 A | 4/1989 | Ficken |
| 4,887,208 A | 12/1989 | Schneider et al. |
| 4,936,738 A | 6/1990 | Brennan |
| 4,958,280 A | 9/1990 | Pauly et al. |
| 5,038,283 A | 8/1991 | Caveney |
| 5,093,794 A | 3/1992 | Howie et al. |
| 5,101,352 A | 3/1992 | Rembert |
| 5,105,627 A | 4/1992 | Kurita |
| 5,113,349 A | 5/1992 | Nakamura et al. |
| 5,122,959 A | 6/1992 | Nathanson et al. |
| 5,235,819 A | 8/1993 | Bruce |
| 5,237,158 A | 8/1993 | Kern et al. |
| 5,246,332 A | 9/1993 | Bernard |
| 5,265,006 A | 11/1993 | Asthana |
| 5,272,638 A | 12/1993 | Martin et al. |
| 5,273,392 A | 12/1993 | Bernard |
| 5,322,406 A | 6/1994 | Pippin et al. |
| 5,334,824 A | 8/1994 | Martinez |
| 5,362,948 A | 11/1994 | Morimoto |
| 5,363,310 A | 11/1994 | Haj-Ali Ahmadi et al. |
| 5,395,206 A | 3/1995 | Cerny, Jr. |
| 5,402,336 A | 3/1995 | Spiegelhoff et al. |
| 5,428,546 A | 6/1995 | Shah et al. |
| 5,434,394 A | 7/1995 | Roach et al. |
| 5,450,317 A | 9/1995 | Lu et al. |
| 5,479,530 A | 12/1995 | Nair et al. |
| 5,533,361 A | 7/1996 | Halpern |
| 5,535,407 A | 7/1996 | Yanagawa et al. |
| 5,548,518 A | 8/1996 | Dietrich et al. |
| 5,553,312 A | 9/1996 | Gattey et al. |
| 5,568,393 A | 10/1996 | Ando et al. |
| 5,592,378 A | 1/1997 | Cameron et al. |
| 5,593,269 A | 1/1997 | Bernard |
| 5,598,487 A | 1/1997 | Hacker et al. |
| 5,615,121 A | 3/1997 | Babayev et al. |
| 5,640,002 A | 6/1997 | Ruppert et al. |
| 5,664,110 A | 9/1997 | Green et al. |
| 5,666,493 A | 9/1997 | Wojcik et al. |
| 5,687,322 A | 11/1997 | Deaton et al. |
| 5,694,551 A | 12/1997 | Doyle et al. |
| 5,710,887 A | 1/1998 | Chelliah et al. |
| 5,712,989 A | 1/1998 | Johnson et al. |
| 5,758,313 A | 5/1998 | Shah et al. |
| 5,758,328 A | 5/1998 | Giovannoli |
| 5,758,329 A | 5/1998 | Wojcik et al. |
| 5,761,673 A | 6/1998 | Bookman et al. |
| 5,768,139 A | 6/1998 | Pippin et al. |
| 5,809,479 A | 9/1998 | Martin et al. |
| 5,816,725 A | 10/1998 | Sherman et al. |
| 5,826,242 A | 10/1998 | Montulli |
| 5,826,825 A | 10/1998 | Gabriet |
| 5,831,860 A | 11/1998 | Foladare et al. |
| 5,832,457 A | 11/1998 | Cherney |
| 5,834,753 A | 11/1998 | Danielson et al. |
| 5,835,914 A | 11/1998 | Brim |
| 5,839,117 A | 11/1998 | Cameron et al. |
| 5,848,395 A | 12/1998 | Edgar et al. |
| 5,878,401 A | 3/1999 | Joseph |
| 5,880,443 A | 3/1999 | McDonald et al. |
| 5,884,216 A | 3/1999 | Shah et al. |
| 5,893,076 A | 4/1999 | Hafner et al. |
| 5,894,554 A | 4/1999 | Lowery et al. |
| 5,897,622 A | 4/1999 | Blinn et al. |
| 5,897,629 A | 4/1999 | Shinagawa et al. |
| 5,899,088 A | 5/1999 | Purdum |
| 5,910,896 A | 6/1999 | Hahn-Carlson |
| 5,918,213 A | 6/1999 | Bernard et al. |
| 5,922,040 A | 7/1999 | Prabhakaran |
| 5,943,652 A | 8/1999 | Sisley et al. |
| 5,943,841 A | 8/1999 | Wunscher |
| 5,949,776 A | 9/1999 | Mahany et al. |
| 5,956,709 A | 9/1999 | Xue |
| 5,960,411 A | 9/1999 | Hartman et al. |
| 5,961,601 A | 10/1999 | Iyengar |
| 5,963,919 A | 10/1999 | Brinkley et al. |
| 5,974,401 A | 10/1999 | Enomoto et al. |
| 5,979,757 A | 11/1999 | Tracy et al. |
| 5,983,200 A | 11/1999 | Slotznick |
| 5,987,377 A | 11/1999 | Westerlage et al. |
| 5,991,739 A | 11/1999 | Cupps et al. |
| 5,999,914 A | 12/1999 | Blinn et al. |
| 6,003,015 A | 12/1999 | Kang et al. |
| 6,006,100 A | 12/1999 | Koenck et al. |
| 6,016,504 A | 1/2000 | Arnold et al. |
| 6,023,683 A | 2/2000 | Johnson et al. |
| 6,026,378 A | 2/2000 | Onozaki |
| 6,058,417 A | 5/2000 | Hess et al. |
| 6,061,607 A | 5/2000 | Bradley et al. |
| 6,070,147 A | 5/2000 | Harms et al. |
| 6,073,108 A | 6/2000 | Peterson |
| 6,081,789 A | 6/2000 | Purcell |
| 6,083,279 A | 7/2000 | Cuomo et al. |
| 6,084,528 A | 7/2000 | Beach et al. |
| 6,085,170 A | 7/2000 | Tsukuda |
| 6,087,952 A | 7/2000 | Prabhakaran |
| 6,088,648 A | 7/2000 | Shah et al. |
| 6,094,642 A | 7/2000 | Stephenson et al. |
| 6,101,481 A | 8/2000 | Miller |
| 6,101,486 A | 8/2000 | Roberts et al. |
| 6,115,690 A | 9/2000 | Wong |
| 6,123,259 A | 9/2000 | Ogasawara |
| 6,140,922 A | 10/2000 | Kakou |
| 6,144,848 A | 11/2000 | Walsh et al. |
| 6,157,945 A | 12/2000 | Balma et al. |
| 6,167,380 A | 12/2000 | Kennedy et al. |
| 6,167,382 A | 12/2000 | Sparks et al. |
| 6,178,510 B1 | 1/2001 | O'Connor et al. |
| 6,182,053 B1 | 1/2001 | Rauber et al. |
| 6,185,625 B1 | 2/2001 | Tso et al. |
| 6,215,952 B1 | 4/2001 | Yoshio et al. |
| 6,233,543 B1* | 5/2001 | Butts et al. .................. 703/27 |
| 6,236,974 B1 | 5/2001 | Kolawa et al. |
| 6,249,801 B1* | 6/2001 | Zisapel et al. ............... 718/105 |
| 6,260,024 B1 | 7/2001 | Shkedy |
| 6,275,812 B1 | 8/2001 | Haq et al. |
| 6,289,260 B1 | 9/2001 | Bradley et al. |
| 6,289,370 B1 | 9/2001 | Panarello et al. |
| 6,292,784 B1 | 9/2001 | Martin et al. |
| 6,324,520 B1 | 11/2001 | Walker et al. |
| 6,332,334 B1 | 12/2001 | Faryabi |
| 6,341,269 B1 | 1/2002 | Dulaney et al. |
| 6,343,275 B1 | 1/2002 | Wong |
| 6,397,246 B1 | 5/2002 | Wolfe |
| 6,405,173 B1 | 6/2002 | Honarvar et al. |
| 6,424,947 B1 | 7/2002 | Tsuria et al. |
| 6,438,652 B1* | 8/2002 | Jordan et al. ................. 711/120 |
| 6,445,976 B1 | 9/2002 | Ostro |
| 6,453,306 B1 | 9/2002 | Quelene |
| 6,463,345 B1 | 10/2002 | Peachey-Kountz et al. |
| 6,463,420 B1 | 10/2002 | Guidice et al. |
| 6,484,150 B1 | 11/2002 | Blinn et al. |
| 6,496,205 B1 | 12/2002 | White et al. |
| 6,505,093 B1 | 1/2003 | Thatcher et al. |
| 6,505,171 B1 | 1/2003 | Cohen et al. |
| 6,526,392 B1 | 2/2003 | Dietrich et al. |
| 6,530,518 B1 | 3/2003 | Krichilsky et al. |
| 6,549,891 B1 | 4/2003 | Rauber et al. |
| 6,567,786 B1 | 5/2003 | Bibelnieks et al. |
| 6,571,213 B1 | 5/2003 | Altendahl et al. |
| 6,578,005 B1 | 6/2003 | Lesaint et al. |
| 6,587,827 B1 | 7/2003 | Hennig et al. |
| 6,594,641 B1 | 7/2003 | Southam |
| 6,594,692 B1 | 7/2003 | Reisman |
| 6,595,342 B1 | 7/2003 | Maritzen et al. |
| 6,598,024 B1 | 7/2003 | Walker et al. |
| 6,598,027 B1 | 7/2003 | Breen, Jr. |
| 6,622,127 B1 | 9/2003 | Klots et al. |
| 6,654,726 B1 | 11/2003 | Hanzek |
| 6,697,964 B1 | 2/2004 | Dodrill et al. |
| 6,741,995 B1 | 5/2004 | Chen et al. |

| | | |
|---|---|---|
| 6,748,318 B1 | 6/2004 | Jones |
| 6,748,418 B1 | 6/2004 | Yoshida et al. |
| 6,763,496 B1 | 7/2004 | Hennings et al. |
| 6,792,459 B2 | 9/2004 | Elnozahy et al. |
| 6,862,572 B1 | 3/2005 | de Sylva |
| 6,873,970 B2 | 3/2005 | Showghi et al. |
| 6,879,965 B2 | 4/2005 | Fung et al. |
| 6,904,455 B1 | 6/2005 | Yen |
| 6,970,837 B1 | 11/2005 | Walker et al. |
| 6,975,937 B1 | 12/2005 | Kantarjiev et al. |
| 6,980,962 B1 | 12/2005 | Arganbright et al. |
| 6,990,460 B2 | 1/2006 | Parkinson |
| 7,010,501 B1 | 3/2006 | Roslak et al. |
| 7,028,187 B1 | 4/2006 | Rosen |
| 7,035,914 B1 | 4/2006 | Payne et al. |
| 7,040,541 B2 | 5/2006 | Swartz et al. |
| 7,085,729 B1 | 8/2006 | Kennedy et al. |
| 7,139,637 B1 | 11/2006 | Waddington et al. |
| 7,177,825 B1 | 2/2007 | Borders et al. |
| 7,197,547 B1 | 3/2007 | Miller et al. |
| 7,222,161 B2 | 5/2007 | Yen et al. |
| 7,233,914 B1 | 6/2007 | Wijaya et al. |
| 7,240,283 B1 | 7/2007 | Paila et al. |
| 7,251,612 B1 | 7/2007 | Parker et al. |
| 7,308,423 B1 | 12/2007 | Woodward et al. |
| 7,346,564 B1 | 3/2008 | Kirklin et al. |
| 7,346,584 B2 | 3/2008 | Kirklin et al. |
| 7,370,005 B1 | 5/2008 | Ham et al. |
| 7,383,233 B1 | 6/2008 | Singh et al. |
| 7,437,305 B1 | 10/2008 | Kantarjiev |
| 7,792,712 B2 | 9/2010 | Kantarjiev et al. |
| 2001/0013007 A1 | 8/2001 | Tsukuda |
| 2001/0037229 A1 | 11/2001 | Jacobs et al. |
| 2001/0042021 A1 | 11/2001 | Matsuo et al. |
| 2001/0042050 A1 | 11/2001 | Fletcher et al. |
| 2001/0047310 A1 | 11/2001 | Russell |
| 2001/0049619 A1 | 12/2001 | Powell et al. |
| 2001/0049672 A1 | 12/2001 | Moore |
| 2002/0002513 A1 | 1/2002 | Chiasson |
| 2002/0004766 A1 | 1/2002 | White |
| 2002/0007299 A1 | 1/2002 | Florence |
| 2002/0010633 A1 | 1/2002 | Brotherson |
| 2002/0013950 A1 | 1/2002 | Tomsen |
| 2002/0038224 A1 | 3/2002 | Bhadra |
| 2002/0038261 A1 | 3/2002 | Kargman et al. |
| 2002/0049853 A1 | 4/2002 | Chu et al. |
| 2002/0050526 A1 | 5/2002 | Swartz et al. |
| 2002/0065700 A1 | 5/2002 | Powell et al. |
| 2002/0072994 A1 | 6/2002 | Mori et al. |
| 2002/0103724 A1 | 8/2002 | Huxter |
| 2002/0116279 A1 | 8/2002 | Nobilo |
| 2002/0188530 A1 | 12/2002 | Wojcik et al. |
| 2002/0194084 A1 | 12/2002 | Surles |
| 2002/0194087 A1 | 12/2002 | Spiegel et al. |
| 2003/0045340 A1 | 3/2003 | Roberts |
| 2003/0065565 A1 | 4/2003 | Wagner et al. |
| 2003/0119485 A1 | 6/2003 | Ogasawara |
| 2003/0233190 A1 | 12/2003 | Jones |
| 2004/0107125 A1 | 6/2004 | Guheen et al. |
| 2004/0236635 A1 | 11/2004 | Publicover |
| 2005/0027580 A1 | 2/2005 | Crici et al. |
| 2005/0144641 A1 | 6/2005 | Lewis |
| 2005/0261985 A1 | 11/2005 | Miller et al. |
| 2006/0085250 A1 | 4/2006 | Kantarjiev et al. |
| 2006/0142895 A1 | 6/2006 | Waddington et al. |
| 2007/0016463 A1 | 1/2007 | Borders et al. |
| 2007/0162353 A1 | 2/2007 | Borders et al. |
| 2007/0055580 A1 | 3/2007 | Woodward et al. |
| 2007/0112647 A1 | 5/2007 | Borders et al. |
| 2007/0136149 A1 | 6/2007 | Woodward et al. |
| 2007/0174144 A1 | 7/2007 | Borders et al. |
| 2007/0250572 A1 | 10/2007 | Paila et al. |
| 2008/0154709 A1 | 6/2008 | Ham et al. |
| 2008/0015959 A1 | 7/2008 | Kruglikov et al. |
| 2009/0063439 A1 | 3/2009 | Rauser et al. |
| 2009/0150534 A1 | 6/2009 | Miller et al. |

FOREIGN PATENT DOCUMENTS

| | | |
|---|---|---|
| FR | 2696722 | 4/1994 |
| GB | 2 265 032 A | 9/1993 |
| WO | WO99/07121 | 2/1999 |
| WO | WO 99/09508 | 2/1999 |

OTHER PUBLICATIONS

"Peapod Interactive Grocery Shopping and Delivery Service Now Delivers Via the Internet", Press Release, peapod.com, Apr. 22, 1996, pp. 1-2.

Anupindi et al., "Estimation of Consumer Demand with Stock-Out Based Substitution: An Application to Vending Machine Product", Marketing Science, vol. 17, No. 4, 1998, pp. 406-423.

Anon, Automatic ID News, "20/20 Results Achieved with Technology Trio", Sep. 1995, p. 19.

Fynes, Brian, et al., The Impact of Electronic Data Interchange on Competitiveness in Retail Supply Chain, IBAR vol. 14, No. 2, pp. 16-28, 1993.

Hiroo Kawata, "Information Technology of Commercial Vehicles in the Japanese Parcel Service Business," Abstract No. XP-000560489, 1992, pp. 371-382.

Hyten, Todd, "Stop & Shop mulls online grocery store", Boston Business Journal (Boston, MA, US), Mar. 22, 1996, vol. 16, No. 6, p. 1.

Jaffe, Charles A. "Gas supplier takes timing seriously if deliveries are late, the product is free," The Morning Call, Allentown, PA, Feb. 5, 1989, pp. 1-4.

Koster, Rene de, "Routing Orderpickers in a Warehouse: A Comparison Between Optimal and Heuristic Solutions," IIE Transactions, May 1998, vol. 30, No. 5, p. 469.

Maloney, David, "The New Corner Drugstore", Modern Materials Handling, May 1, 2000, vol. 55, No. 5, p. 58.

Norton, Tim R., "End-To-End Response-Time: Where to Measure?", Computer Measurement Group Conference Proceedings, CMG99 Session 423, Dec. 1999, pp. 1-9.

Parker, Rachel, "UPS Pioneers a cellular data network", InfoWorld, ABI/INFORM Global, Jun. 8, 1992, p. S59-S60.

Anon, PC Foods, "Customer Service Agreement," printed from website: http://www.pcfoods.com, Abstract No. XP-002245026, 1999, pp. 1-2.

Pearce, Michael R. "From carts to clicks", Ivey Business Quarterly, Autumn 1998, vol. 63, No. 1, p. 69-71.

Sekita, Takashi, "The Physical Distribution Information Network in the Home-Delivery Business," Japan Computer Quarterly, Abstract No. XP-00.431194, 1990, pp. 23-32.

Smith et al., "Management of Multi-Item Retail Inventory Systems with Demand Substitution", Operations Research, vol. 48, No. 1, Jan.-Feb. 2000, pp. 50-64.

Fielding et al., "Hypertext Transfer Protocol—HTTP/1.1, RFC 2616", Network Working Group, Jun. 1999, pp. 1-90.

Towie, Henry, "On the Fast Track with Totaltracks: UPS Deploys Mobile Date Service," Abstract No. XP-000560076, Document Delivery World, vol. 9, No. 3, 1993, pp. 30-31.

Van Den Berg, Jeroen P., "A Literature Survey on Planning and Control of Warehousing Systems", IIE Transactions, Aug. 1999, vol. 31, No. 3, p. 751.

Vass et al., "The World Wide Web—Everything you (n)ever wanted to know about its server", IEEE, Oct./Nov. 1998, pp. 33-37.

Wilson, Joe, "Selecting Warehouse Management Software (WMS) for Food Distribution Operations", Frozen Food Digest, Oct. 1998, vol. 14, No. 1, p. 18.

Wunnava et al., "Interactive Mulitmedia on the World Wide Web", IEEE, Aug. 1999, pp. 110-115.

www.peapod.com, including Introduction to Peapod; How Peapod Works; Peapod: Choosing a Delivery Time; Peapod: Sending Your Order; Retrieved from Internet Archive (web.archive.org) on Jul. 23, 2006, alleged date Nov. 13, 1996, pp. 1-9.

Alba et al., "Interactive home shopping: Consumer, retailer, and manufacturer incentives to participate in electronic marketplaces", Journal of Marketing, vol. 61, No. 3, Jul. 1, 1997, 18 pgs.

Bloch et al., "On the Road of Electronic Commerce—a Business Value Framework, Gaining Competitive Advantage and Some Research Issues", Mar. 1996, 20 pages.

Brown Janelle, "Pod People Peapod, the online grocery service, sounds great—but can it deliver?" Salon Media Group, Inc., Dec. 17, 1998, 3 pages.

Corcoran, Cathy, "The Skeptic's Guide to on-line shopping. Who has time to shop for groceries? So we gave Peapod a test run." The Patriot Ledger, Quincy, MA, Jul. 7, 1997, 4 pages.

Descartes Licenses Energy V6 Supply Chain Suite to Major Pepsi Bottler . . . News Release, Descartes Systems Group Inc., Waterloo Ontario, Aug. 27, 1998, 2 pages.

Dilger, Karen Abramic, "Warehouse Wonders", Manufacturing Systems, vol. 15, No. 2, Feb. 1, 1997, 4 pages.

Dyson et al., "Electronic Delivery without the Internet (Digital Delivery of Newspapers)", The Seybold Report on Publishing Systems, vol. 25, No. 1, ISBN: 0736-7260, Sep. 1, 1995, 9 pages.

Eckerson, Wayne, "Grocers put stock in EDI to streamline deliveries; New electronic data interchange systems offer a wealth of benefits for retailers and suppliers," Network World, Inc., Aug. 7, 1989, 2 pages.

First Stop—Main Menu, website tour, Peapod, http://web.archive.org/web/19961113150913/www.peapod.com/tour1.html, Nov. 13, 1996, 13 pages.

Frequently Asked Questions, webpages, Peapod, http://web.archive.org/web/19961113150832/www.peapod.com/question.html, Nov. 13, 1996, 2 pages.

"Here's How Peapod Works," webpages, Peapod, http://web.archive.org/web/19961113151243/www.peapod.com/work.html, Nov. 13, 1996, 2 pages.

"Installation and Shopping Tips for the Mac," Peapod Video, 1993, 1 page.

"Introduction to Peapod," webpages, Peapod, http://web.archive.org/web/19961113145506/www.peapod.com/intro.html, Nov. 13, 1996, 2 pages.

Ives et al., "The Information System as a Competitive Weapon", Communications of the ACM, vol. 27, No. 12, Dec. 1984. 9 pages.

Maeglin, Kathy, "Services Take the 'Shop' Out of Shopping for Groceries", The Capital Times, Mar. 20, 1997, 2 pages.

Mai et al., "Consumers' Perceptions of Specialty Foods and the Rural Mail Order Business", 52nd EAAE Seminar—Parma, Jun. 19-21, 1997, pp. 331-348.

Malone et al., "Computers, Networks, and The Corporation," Center for Information Systems Research, MIT, Aug. 1991, 14 pages.

Marsh, Barbara, "Peapod's On-Line Grocery Service Checks Out Success—Customers Shop Electronic Aisles; Finicky Workers Sack the Goods", The Wall Street Journal, Jun. 30, 1994, 2 pages.

Meeker et al., The Internet Retailing Report, U.S. Investment Research, Morgan Stanley, May 28, 1997, 241 pages.

Menzies, David, "Checking out the aisles by computer: Cori Bonina, General Manager of Stong's market in Vancouver, has made a virtual success of a meat-and-potatoes business", National Post, Dec. 1, 1998, 2 pages.

"More Information," webpages, Peapod http://web.archive.org/web/19961113145540/www.peapod.com/more.html, Nov. 13, 1996, 2 pages.

"Online Groceries, A Quicker Shopping Cart?" E-Commerce Customers—What, Where and Why They Buy, Standard Media Inc. and Odyssey, LP, Spring 2000, 19 pages.

Patterson, Rebecca H., "No Lines at Britain's First On-Line Grocery Store, but You Still May Wait", The Wall Street Journal Europe, Jul. 25, 1997, 3 pages.

Peapod, Inc., Telephone Grocery Shopping Guide, Aug. 7, 1992, 3 introductory pages and pp. 1-12.

Podmolik, Mary Ellen, "Groceries Seeing Green From Computer Shopping", Chicago Sun-Times, May 8, 1996, 1 page.

Poirier, Charles et al., Supply Chain Optimization, Building the Strongest Total Business Network, Berrett-Koehler Publishers, San Francisco, Copyright 1996, 30 pages.

Purpura, Linda, "Getting to House from Order Smooth Transitions from Order, To Pick, To Pack, To Delivery, are a Vital Part of a Successful Home-Shopping Program", Supermarket News, Oct. 6, 1997, 2 pages.

Reynolds, Janice, "Logistics and Fulfillment for E-Business", ISBN: 1-57820074-1, 2001, 60 pages.

"Shopping-Virtually Hassle-Free", Computer Weekly, Apr. 10, 1997, 2 pages.

Smart Shopping for Busy People, webpage, Peapod, http://web.archive.org/web/19961113145048/www.peapod.com/ Nov. 11, 1996, 1 page.

User Manual, Peapod, Inc., Version 3.10, Aug. 7, 1992, 83 pages.

Van Mieghem, Jan A., "Peapod: Mass Customized Service", Kellogg School of Management, Northwestern University, Aug. 28, 2001 (Rev. Nov. 22, 2004), 13 pages.

Numetrix Unveils xtr@; an Internet-Designed Solution for Real-Time Supply Chain Collaboration, Business/Technology Editors, Business Wire, New York: Dec. 16, 1998, pp. 1-4.

Hoffman, Thomas, "New UPS CIO eyes cyberdelivery," Computerworld, Nov. 11, 1996, 30, 46; ABI/INFORM Global, p. 4.

Booker, et al. "Up in the air", Computerworld, Oct. 11, 1993; 27, 41; ABI/INFORM Global, p. 54.

"Imposing an Objective Viewpoint," Modern Purchasing, vol. 36, Iss. 3, Mar. 1994, pp. 1-4.

"New Medium, new message," The Economist, vol. 329, Iss. 7834, Oct. 23, 1993, p. S 16, pp. 1-5.

Office Action for U.S. Appl. No. 09/568,823 dated Oct. 6, 2003.

Office Action for U.S. Appl. No. 09/568,823 dated May 5, 2004.

Advisory Action for U.S. Appl. No. 09/568,823 dated Aug. 19, 2004.

Notice of Allowance for U.S. Appl. No. 09/568,823 dated Oct. 5, 2004.

Notice of Allowance for U.S. Appl. No. 09/568,823 dated Jun. 2, 2005.

Notice of Allowance for U.S. Appl. No. 09/568,823 dated Jun. 22, 2006.

Notice of Allowance for U.S. Appl. No. 11/191,413 dated Oct. 17, 2008.

Notice of Allowance for U.S. Appl. No. 11/191,413 dated Feb. 23, 2009.

Chandler, Susan. "The grocery cart in your PC," Business Week, Iss. 3441, 1995, p. 63, 2 pages.

eShopper: Resources for Web Buyeing. Savetz, Kevin; Gardiner, Peace, Computer Shopper, 19, 5, 280(1), May, 1999.

Dialog Search Results, re: U.S. Appl. No. 11/705,982 dated Sep. 13, 2010, pp. 1-54.

Saccomano, Ann, "'Blue Laws' Still Apply," Traffic World, LOGISTICS Section, p. 15, Aug. 23, 1999, 2 pages.

* cited by examiner

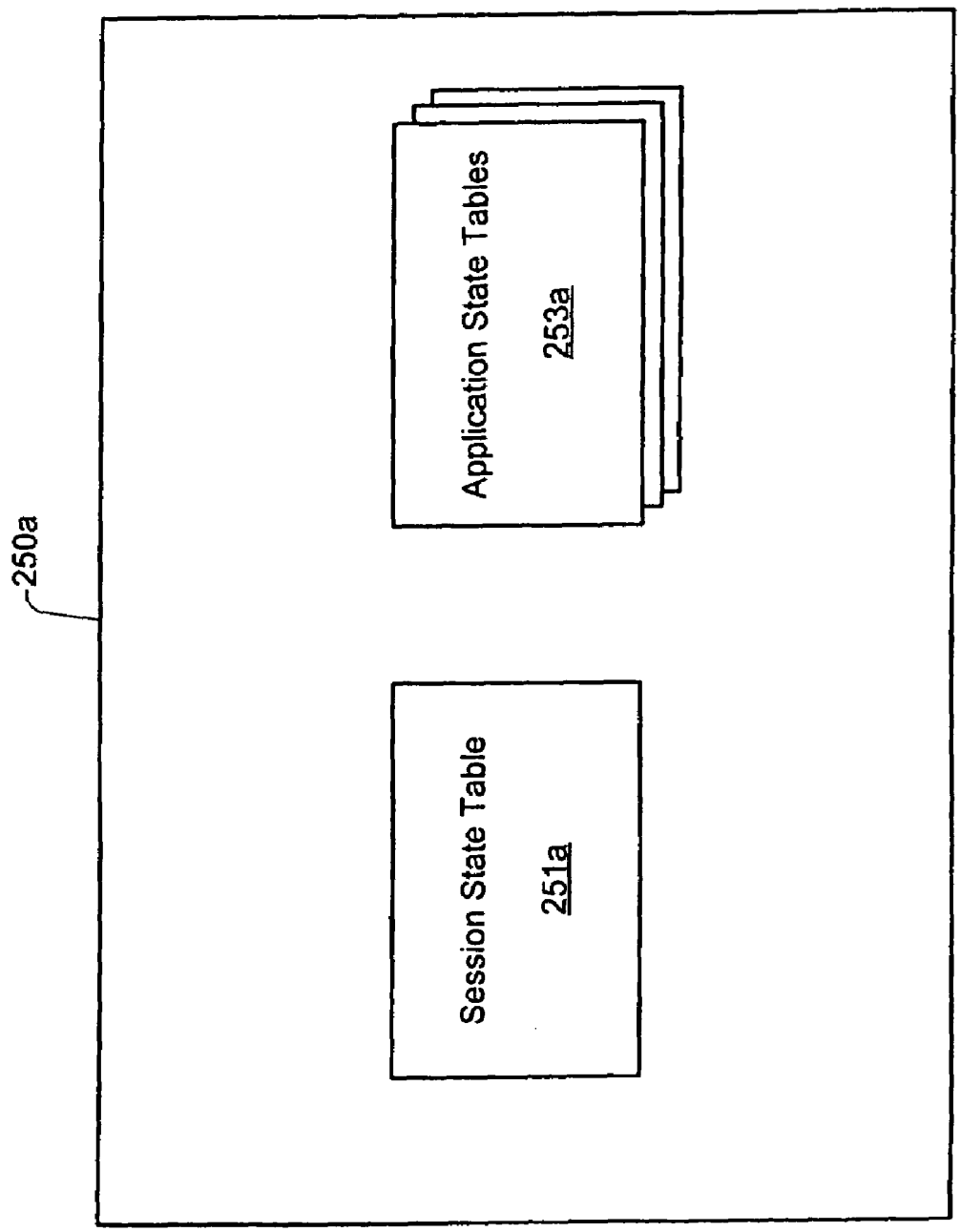

LOAD BALANCING TECHNIQUE IMPLEMENTED IN A DATA NETWORK DEVICE UTILIZING A DATA CACHE

CROSS-REFERENCE TO RELATED APPLICATIONS

This application is a continuation of U.S. patent application Ser. No. 11/191,413 (now U.S. Pat. No. 7,509,407), entitled "LOAD BALANCING TECHNIQUE IMPLEMENTED IN DATA NETWORK DEVICE USING A DATA CACHE," filed Jul. 27, 2005, the entirety of which is incorporated herein by reference for all purposes, which application is a continuation of U.S. patent application Ser. No. 09/588,823 (now U.S. Pat. No. 7,197,547), entitled "LOAD BALANCING TECHNIQUE IMPLEMENTED IN A DATA NETWORK DEVICE UTILIZING A DATA CACHE," filed May 10, 2000, the entirety of which is incorporated herein by reference for all purposes, which claims priority under 35 USC 119(e) from U.S. Provisional Patent Application No. 60/133,646, entitled ELECTRONIC COMMERCE ENABLED DELIVERY SYSTEM AND METHOD, flied May 11, 1999, the entirety of which is incorporated herein by reference for all purposes.

BACKGROUND OF THE INVENTION

1. Field of the Invention

The present invention relates generally to data networks, and more specifically to a load balancing technique implemented in a data network device utilizing a data cache.

2. Description of the Related Art

Content providers on the World Wide Web are willing to pay a great deal of money to ensure that their information is provided quickly and efficiently to any given client or user. Recently, there has been a great deal of research effort directed at reducing network congestion and increasing server response time. One particular area which has received much attention relates to load balancing techniques for network traffic.

FIG. 1 shows a schematic block diagram of a conventional load balancing implementation which may be used to increase server response time to a given user. In the example of FIG. 1, a client or user 102 desires to access a specific web page associated with a specific URL such as, for example, www.yahoo.com. As shown in FIG. 1, the content provider associated with the desired URL has implemented a load balanced host server system 130 which includes a load balancing device 104, a farm of web servers 110, and a centralized database 120. Each server 110a, 110b, 110n of the server farm 110 includes identical content corresponding to the content provider's entire web site. When the user 102 attempts to access the content provider's web site, via gateway device 106 and the Internet 108, the user is first directed to the load balancing device 104. The load balancing device then dynamically determines which server of the server farm 110 is the least busy, and forwards the client request to the identified server. Thus, for example, if the load balancing device 104 determines that Server A 110a is the least busy, the load balancing device will forward the client request (e.g., client HTTP request) to Server 110a. Server 110a then generates a response to the client request, and transmits the response to load balancing device 104, where it is then forwarded to the client 102. Each time the client transmits an HTTP request to the load balancing device 104, the load balancing device selects an appropriate (e.g., least busy) server of the server farm 110 to respond to the client request. Moreover, since the content on each server is identical, more than one server may be used for responding to requests from a particular client. Further, it will be appreciated that the host server system 130 also provides fail over protection by way of multiple redundant servers (e.g., 110a, 110b, 110n).

Implementing State in TCP

As commonly known to one having ordinary skill in the art, TCP (Transmission Control Protocol) is a stateless protocol. Thus, in order to implement state over TCP/IP, content providers conventionally use a "cookie file" file to maintain state information for a given client. Typically, the cookie file will be transmitted to the client where it is then stored on the client machine. When the client machine accesses a particular web server, the web server retrieves the appropriate cookie file data from the client machine in order to properly respond to the client. According to one conventional technique, the client cookie file will include all necessary state information relating to the client's current session with the web server. This implementation may be useful in situations where there is a relatively small amount of state information to be stored in the cookie file. However, problems may be encountered when there is a relatively large amount of state or other information to be stored in the cookie file. For example, if the user accesses an electronic commerce site such as, for example, an on-line grocery store, the user may select dozens or even hundreds of items to add to his or her electronic shopping cart. Each time the user adds a new item to the electronic shopping cart, the state information for that user needs to be updated to include the new item. Moreover, a new cookie file which includes the updated state information (including the updated contents of the user's shopping cart) must be transmitted back to the user's computer. This may result in a significant decrease in response time as experienced by the user. Further, as the user continues to add new items to the shopping cart, the relative response time experienced by the user may continue to decrease.

A second conventional technique for implementing state over TCP/IP provides that the state information relating to a particular client session be stored in a database on the host server system. According to this later technique, when the client first accesses the host server system 130, a session ID is generated for that client session. The session ID is then stored in a cookie file on the client machine 102. The state information corresponding to that client session is stored on the host server database 120, and may be accessed using the session ID. Thereafter, during the client session, each time the client accesses the host server system 130, the assigned host server from the server farm 110 will retrieve the session ID data from the cookie file stored on the client machine, and, using the session ID, will retrieve the appropriate state information from database 120. Thus, according to this technique, when a client adds a new item to his or her shopping cart, for example, the assigned host server will update the client's state information stored on database 120.

Although the later-described technique for implementing state over TCP/IP reduces the amount of data to be written to the client cookie file, it necessarily involves accessing the database 120 each time one of the farm servers 110 desires to read or write state information relating to a particular client session ID. This results in a decreased response time from the host server system 130, as experienced by the user 102. Accordingly, there exists a continual need to improve upon network load balancing and fail over protection techniques.

SUMMARY OF THE INVENTION

According to specific embodiments of the present invention, a load balanced server system is provided for effecting electronic commerce over a data network. The system comprises a load balancing system and a plurality of servers in communication with the load balancing system. Each of the plurality of servers may include a respective data cache for storing state information relating to client session transactions conducted between the server and a particular client. The load balancing system can be configured to select, using a load balancing protocol, an available first server from the plurality of servers to process an initial packet received from a source device such as, for example, a client machine of a customer. The load balancing system can also be configured to route subsequent packets received from the source device to the first server. In this way, a "stickiness" scheme may be implemented in the server system whereby, once an electronic commerce session has been initiated between the first server and the source device, the first server may handle all subsequent requests from the source device in order to make optimal use of the state data stored in the first server's data cache. One technique for implementing the above-described "stickiness" scheme is to configure the content on each of the plurality of servers to include a respective plurality of Uniform Resource Locators (URLs) which correspond to addresses for accessing information specific to the server on which the URL resides.

An additional aspect of the present invention provides that one or more of the subsequent packets received from the source device may include a session ID corresponding an electronic commerce session initiated at the server system for the source device. The first server is configured to access, from the data cache, state information relating to the electronic commerce session associated with the specified session ID. The first server is also configured to generate a response to a subsequent request packet received from the source device using state information retrieved from the data cache. Before generating its response to the subsequent request packet, the first server may verify that the state information relating to the client session stored in the data cache is up-to-date. If the first server determines that the state information stored in the data cache is not up-to-date, then the first server may be configured to retrieve the desired up-to-date state information from a database which is configured to store all state information relating to client sessions which have been initiated with the server system.

An alternate embodiment of the present invention is directed to a system for effecting electronic commerce over a data network. The system comprises means for receiving an initial request packet from a source device, and means for performing a load balancing protocol, wherein the initial packet from the source device is assigned to a first server of a load balanced server system. The load balanced server system may include a plurality of different servers. The first server may comprise a first data cache. The system further comprises means, at the first server, for generating a first response to the initial request packet; means for transmitting the first response to the source device; and means for causing subsequent packets received from the source device to be routed to the first server.

Other embodiments of the present invention are directed to a method or computer program product for effecting electronic commerce over a data network. An initial request packet from a source device is received. A load balancing procedure is then performed, wherein the initial packet from the source device is assigned to a first server of a load balanced server system. The load balanced server system includes a plurality of different servers, each of which includes a respective data cache. A first response to the initial request packet is generated at the first server. The first response is then transmitted to the source device. The response transmitted to the source device causes subsequent packets received from the source device to be routed to the first server.

An alternate embodiment of the present invention is directed to a system for implementing fail over protection of a load balanced server system connected to a data network. The system comprises a load balancing system including a main server unit and a plurality of subordinate server units. The system further includes a plurality of servers in communication with the load balancing system, wherein each server of the plurality of servers is associated with a respective subordinate server unit. The plurality of subordinate server units comprises a first server unit which includes a first server. The plurality of subordinate server units also comprises a second server unit which includes a second server. The system is configured to cause a first plurality of packets received from a source device to be routed to the first server unit while a failure at the first server is not detected. The system is further configured to cause a second plurality of packets received from the source device to be routed to the second server unit while a failure at the first server is detected. An additional aspect of this embodiment provides that each of the servers is configured to generate respective responses to client requests, wherein at least a portion of the responses includes URLs for accessing additional information from the specific server which generated the response.

Further embodiments of the present invention are directed to a method and computer program product for implementing fail over protection of a load balanced server system connected to a data network. A first request packet is received from a source device, the first request packet includes session ID information for identifying an initiated communication session between the source device and a first server of the server system. A failure is then detected at the first server. The first request packet is then routed to a second server selected from the server system in response to detecting the first server failure. A first response to the first request packet is then generated. The first response includes at least one URL for accessing information via the second server. A response packet which includes the first response is then transmitted to the source device. The response packet includes a source IP address corresponding to the first server.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 3 shows a block diagram of a specific implementation for storing customer session and application state data in data cache.

DETAILED DESCRIPTION OF THE PREFERRED EMBODIMENTS

Figure 2:
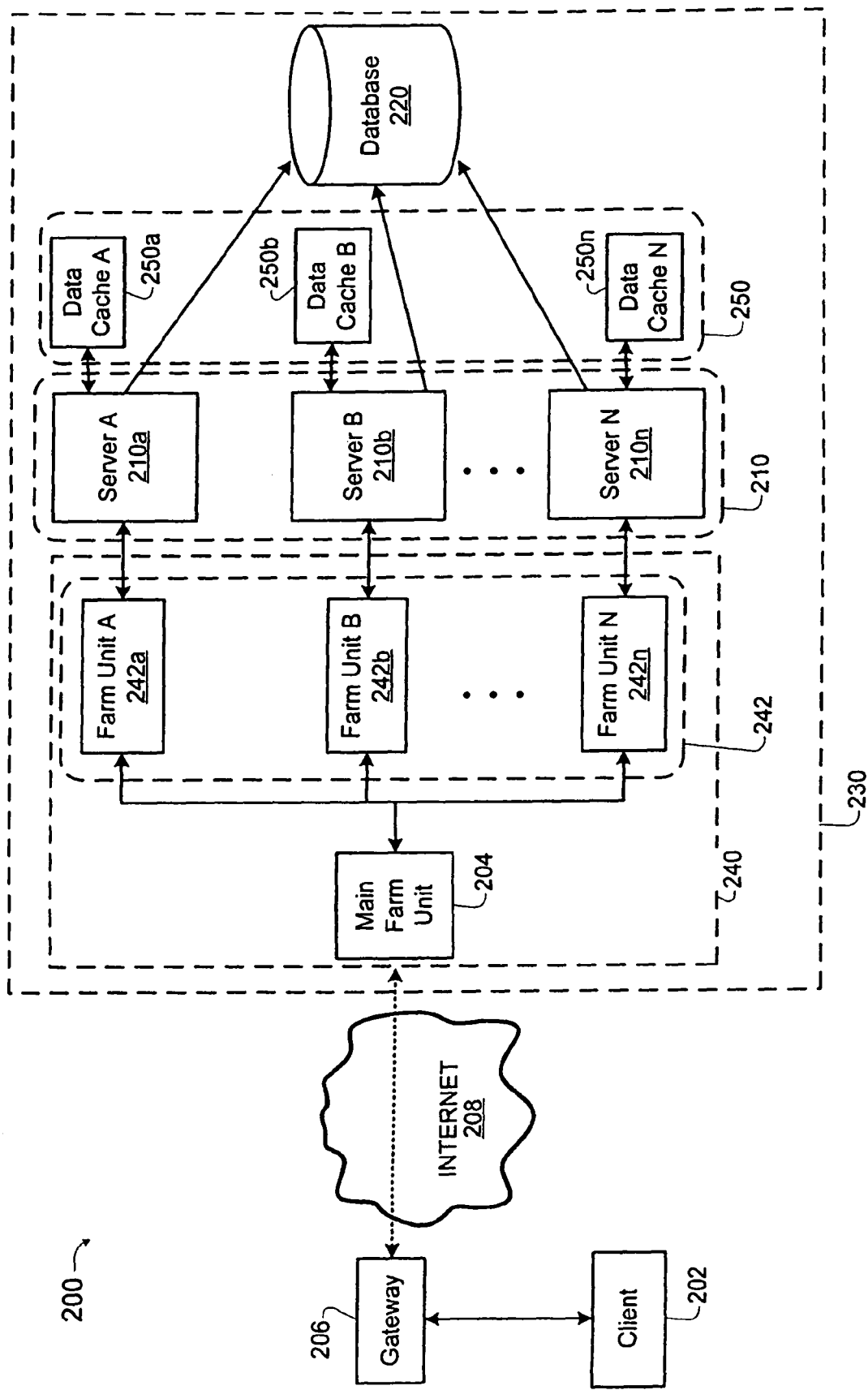
FIG. 2 shows a block diagram of a specific embodiment of a data network which may be used for implementing the technique of the present invention.

FIG. 2 shows a block diagram of a specific embodiment of a data network 200 which may be used for implementing the technique of the present invention. According to the embodiment of FIG. 2, the host server system 230 may be implemented as a load-balanced server farm which includes a load balancing device 240 and a plurality of servers 210. The host server system 230 of the present invention may be used, for example, to implement the Webstore Subsystem described in U.S. patent application Ser. No. 09/568,603 for INTEGRATED SYSTEM FOR ORDERING, FULFILLMENT, AND DELIVERY OF CONSUMER PRODUCTS USING A DATA NETWORK, filed May 10, 2000, which is incorporated herein by reference in its entirety for all purposes.

According to a specific implementation, the load balancing device 240 may be implemented using a conventional load balancing device such as, for example, the RND device manufactured by Radware, Inc., of Mahwah, N.J.

As shown in FIG. 2, the load balancing device 240 may be configured to include a Main Farm Unit 204 and a plurality of subordinate Farm Units 242. According to a specific embodiment, the Main Farm Unit 204 and plurality of subordinate Farm Units 242 may be implemented as logical devices using hardware and/or software. For example, in one embodiment, the Main Farm Unit 204 may be implemented as a logical device on the load balancing device 242. Similarly, one or more of the subordinate Farm Units (e.g., 242a, 242b, 242n) may also be implemented as logical devices on the load balancing device 240. Alternatively, it will be appreciated that the Main Farm Unit 204 and plurality of subordinate Farm Units 242 may each be implemented on separate physical devices which are part of the same computer system or network.

As shown in the embodiment of FIG. 2, each of the plurality of subordinate Farm Units 242 has associated with it one or more respective host servers, collectively identified by reference number 210 of FIG. 2. Thus, for example, as shown in FIG. 2, Farm Unit A 242a is associated with a host Server A 210a, Farm Unit B 242b is associated with a host Server B 210b, and Farm Unit N 242n is associated with a host Server N 210n. It will be appreciated that, in alternative embodiments, one or more of the subordinate Farm Units 242 may be associated a respective plurality of farm servers. For example, Farm Unit A 242a may be configured to be associated with a plurality of host servers assigned to that particular subordinate Farm Unit.

Additionally, as shown in FIG. 2, each of the plurality of host servers 210 is configured to be associated with a respective data cache 250. Thus, for example, Server A 210a is associated with Data Cache A 250a, Server B 210b is associated with date cache B 250b, and Server N 210n is associated with data cache N 250n. According to an alternate embodiment where one or more subordinate Farm Units each is associated with a plurality of servers, each of the plurality of servers associated with a particular subordinate Farm Unit may be configured to access a common data cache for caching data relating to client requests which are processed by any of the servers belonging to the subordinate Farm Unit.

According to at least one embodiment of the present invention, each of the plurality of data caches 250 may be used to store state information for client session transactions which are processed by the host server associated with that data cache. Thus, for example, state data for client sessions which occur at Server A 210a may be stored in cache A 250a, and state data relating to client sessions which occur on Server B 210b may be stored in cache B 250b, etc. According to a specific embodiment, the state data stored in a data cache may include session state data (e.g., user ID, login data, etc.) and application state data (e.g., electronic shopping cart data). As shown in FIG. 2, the server system 230 may also include a database 220 which may be used for storing session and/or application state data similar to that stored on each of the plurality of data caches 250. According to a specific implementation, the database 220 may be implemented using persistent memory, whereas one or more data caches may be implemented using volatile memory.

The technique of the present invention takes advantage of the fact that the access time for accessing data in a data cache is significantly less than that associated with accessing data from persistent memory devices. Accordingly, one advantage of the technique of the present invention is that the response time for accessing the server system of the present invention is significantly faster than that of conventional server systems such as the system shown in FIG. 1 of the drawings.

Moreover, as explained in greater detail below, the technique of the present invention solves a number of additional problems to be overcome in order for a host server of a load-balanced server farm to properly maintain client session state information on a local data cache if that server is to be used for serving HTTP requests from any given client on the World Wide Web.

In order to gain a better understanding of the problems involved with using a local data cache to maintain state information for a web farm server, it is helpful to review current techniques used by service providers to allow their clients to access web servers via the World Wide Web. Typically, most internet service providers (ISPs) provide specific gateway routers for providing client access to the World Wide Web. This is shown, for example, in FIG. 1 of the drawings. When the client 102 wishes to access a specific web site (associated with a specific host server system 130), the ISP client first sends an HTTP request to a specific gateway router 106, which then forwards the request, via Internet 108, to the specified host server system. The HTTP request packet transmitted to the host server system will include a source IP address in the header portion which identifies the source device which sent the packet, such as, for example the client machine 102 or a dedicated proxy server which, for example, may reside at gateway device 106. However, some ISPs such as, for example, America On-Line, Inc. (herein referred to as AOL) use a load-balanced farm of proxy servers to enable their clients to access the World Wide Web. In this situation, a plurality of different proxy servers may transmit packets which originate from a specific AOL client. Accordingly, it is typically the case that packets which are received at a host server system from a specific AOL client will include different source IP addresses, depending upon the particular proxy server which sent the packet.

Figure 1:
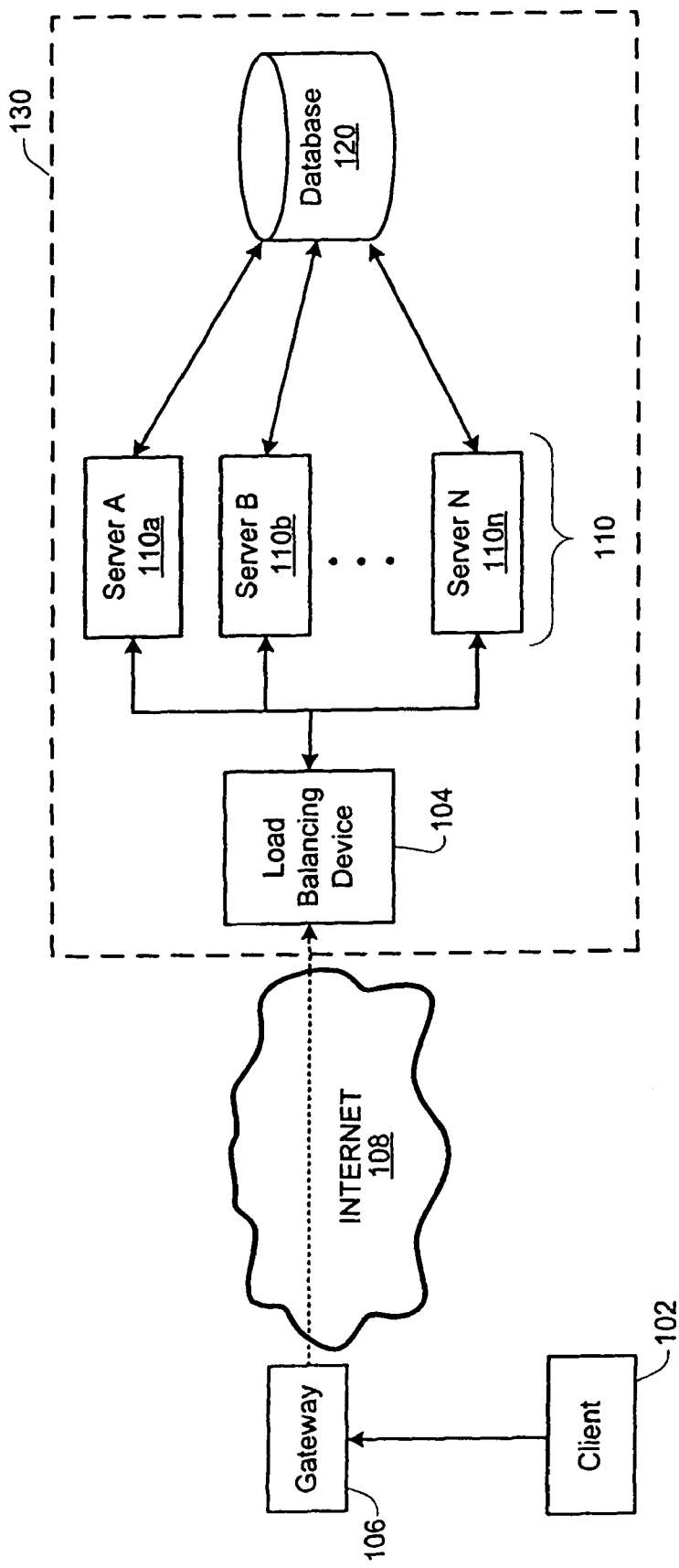
FIG. 1 shows a schematic block diagram of a conventional load balancing implementation.

In applying this knowledge to an example using the system of FIG. 1, it is assumed that the client machine 102 has initiated a session with host server 110a. Further, it is assumed that the host server 110a is associated with a data cache for storing state information relating to the session with client 102. When the load-balancing device 104 receives a subsequent HTTP request packet from client 102, according to the conventional load-balancing technique (described previously with respect to FIG. 1) the load balancing device may farm the request to a different host server such as, for example, Server B 110b. In this situation, Server B would be unaware of the state data cached in the memory of Server A. This will most likely result in Server B responding inappropriately to the client request.

In order to remedy this situation, an additional step should preferably be performed by the load balancing device 104, wherein the device maintains a list of current sessions initiated with each server in the server farm 110. When the HTTP request packet from client 102 is then received at the load balancing device, the load balancing device may then inspect the source IP address of the received packet and use this address to identify the particular host server (e.g., Server A 110a) for which a session with the identified client has already been initiated. Thereafter, each time the client 102 sends a request to the host server system 130, the request will automatically be forwarded to Server A in order to utilize that session's state information which has been cached on Server A.

The problem, however, becomes more complicated when an AOL client initiates a session with the host server system 130. To illustrate this point, reference is again made to the system of FIG. 1, which now includes the improvements described in the preceding example. Additionally, it is assumed that client 102 corresponds to an AOL client. Since AOL uses a farm of proxy servers (not shown) to allow its clients to access the Internet, each request packet which is received at the load balancing device 104 from the AOL client 102 may include a different source IP address in the packet header. Accordingly, the load balancing device 104 will be unable to determine the specific host server which has already initiated a session with the AOL client. Due to the fact that there is no simple solution to this problem, most conventional load balancing and redundancy techniques resort to storing state information for a client session on a centralized database 120 which may be accessed by each of the servers in the farm.

However, contrary to conventional practices, the technique of the present invention offers a practical solution for enabling client session state information to be accessed from a data cache on a server in a load-balanced and/or redundant server farm.

Figure 4A:
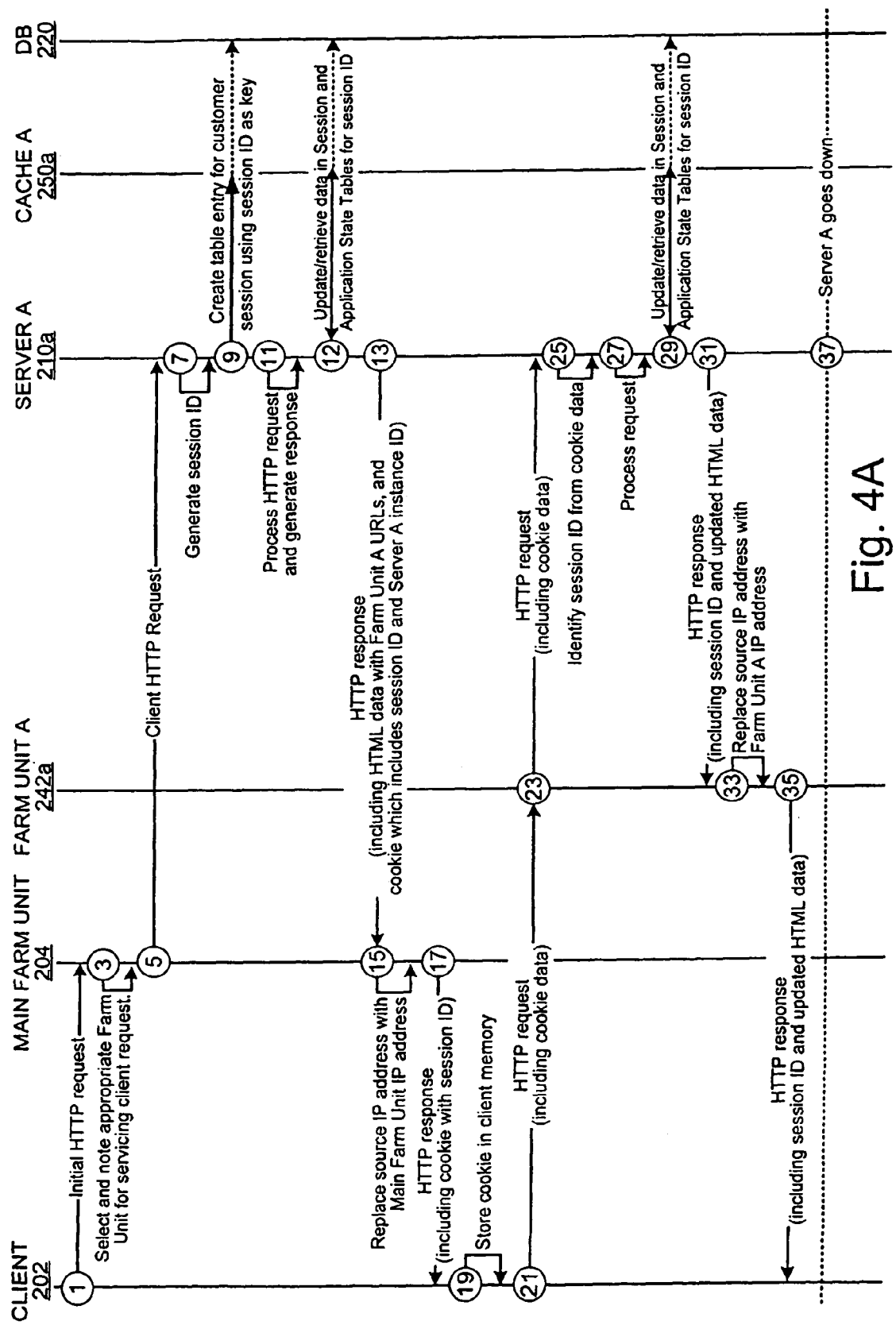
FIGS. 4A, 4B and 4C illustrate data flow diagrams corresponding to a specific implementation of the present invention.
Figure 4B:
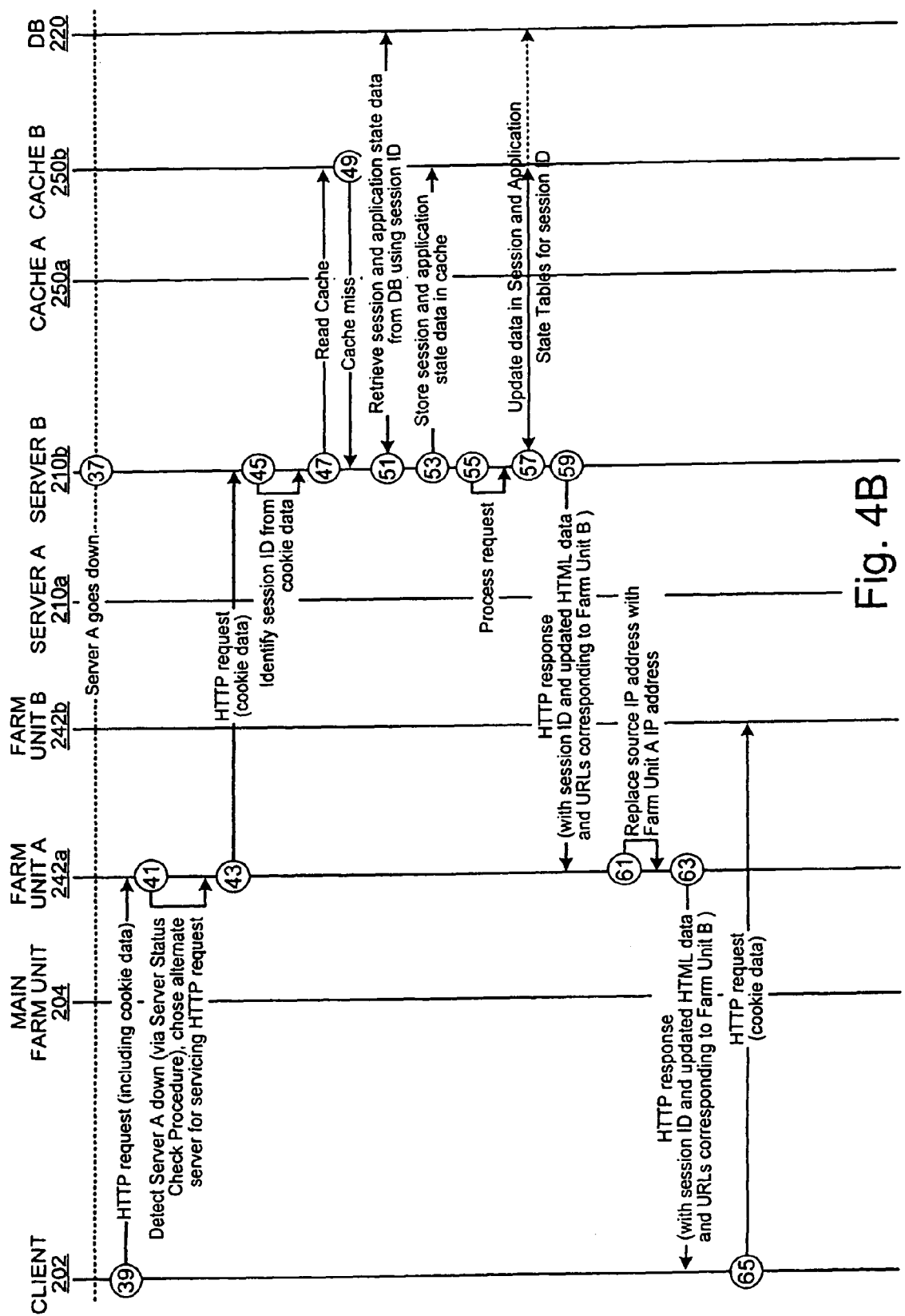
Figure 4C:
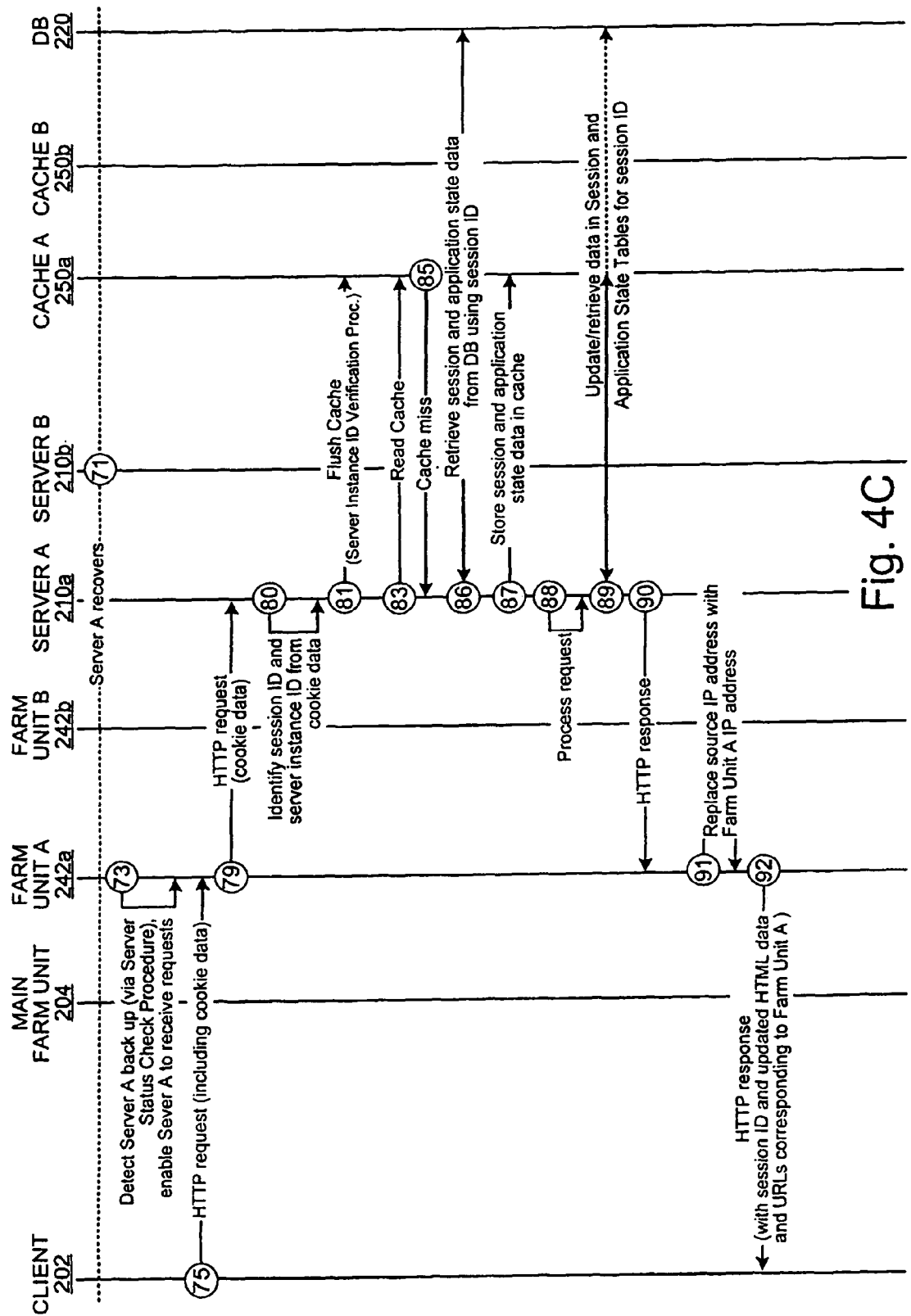

FIGS. 4A, 4B and 4C illustrate data flow diagrams corresponding to a specific implementation of the present invention. The data flow diagrams of FIGS. 4A, 4B and 4C will now be described with reference to FIG. 2 of the drawings.

At (1), the client device 202 transmits an initial request to the host server system 230. In the example of FIGS. 4A, 4B, and 4C it is assumed that the client machine 202 includes a web browser which transmits HTTP requests to the host server system 230. As shown in FIG. 4A, the client request is received at Main Farm Unit 204. At (3) the Main Farm Unit 204 selects an appropriate subordinate Farm Unit (from the plurality of subordinate Farm Units 242) for servicing the client request. In the example of FIG. 4A, it is assumed that the Main Farm Unit 204 selects subordinate Farm Unit A for servicing the client request. As shown in FIG. 2, subordinate Farm Unit A 242a has associated with it a respective server (e.g., Server A 210a) for servicing client requests which are routed to Farm Unit A 242a.

Once the Main Farm Unit has selected an appropriate subordinate Farm Unit for servicing the client request, the Main Farm Unit forwards (5) the client request to the specific server associated with the selected subordinate Farm Unit. Thus, in the example of FIG. 4A, the Main Farm Unit 204 forwards the client request to Server A 210a.

When the initial client request is received at Server A 210a, the server initiates a communication session with the client device, and generates (7) a session ID corresponding to the initiated client session. In the example of FIG. 4A, the session which is initiated and associated with client 202 corresponds to an electronic commerce session initiated at the server system 230 for the client 202.

At (9), Server A creates a table entry for the initiated customer session in Data Cache A 250a and database 220. According to at least one embodiment, Data Cache A 250a may be used for storing and/or retrieving application state data and session state data relating to the customer session initiated with customer 202. The application and session state data relating to the customer session initiated for customer 202 may also be stored in the database 220. According to at least one implementation, the customer session and application state data stored on either the Data Cache A 250a or database 220 may be accessed using the session ID associated with the client 202 customer session.

FIG. 3 shows a block diagram of a specific implementation for storing customer session and application state data in data cache 250a. As shown in FIG. 3, data cache 250a may include one or more tables for storing application and/or session state data relating to selected customer sessions. In the specific implementation of FIG. 3, the data cache 250a includes a session state table 251a and one or more application state tables 253a. The session state table may be used for storing customer session state data such as, for example, customer login information. The application state tables 253a may be used for storing customer application state data such as, for example, the current contents of a customer's electronic shopping cart. Each of the plurality of data caches 250 may include data structures similar to that shown in FIG. 3. Additionally, database 220 may also include data structures which are similar to those shown in FIG. 3.

According to a specific embodiment, each of the plurality of data caches 250 is configured to store session and application state data relating to customer sessions which have been initiated with the data cache's associated server. Thus, for example, Data Cache A 250a may be configured to store and/or provide state data for customer sessions handled by Server A, and Data Cache B 250b may be configured to store and/or provide state data relating to customer sessions initiated with Server B 242b. Further, according to at least one embodiment, the database 220 may be used for storing and/or retrieving state data relating to all customer sessions which have been initiated with the host server system 230. Moreover, according to a specific implementation, the host server system 230 may be configured to store, on the database 220, the most current application and/or session state data for any given customer session.

Returning to FIG. 4A, once Server A receives the initial client request, it processes the initial client request and generates (11) an appropriate response. The processing of the client request may result in a change of the session and/or application state data associated with that client session. Accordingly, as shown in FIG. 4A, any state data which has been modified or updated by Server A will be stored (12) in the Data Cache A 250a, as well as the database 220. This procedure of writing the same data to both the data cache and the database is commonly referred to as a data write-through operation.

At (13), the response generated by Server A 210a is transmitted to the Main Farm Unit 204, which then forwards (17) the response to the client 202. Before transmitting the response to the client 202, the Main Farm Unit 204 replaces (15) the source IP address of the response packet header with the IP address corresponding to the Main Farm Unit 204. One reason for changing the packet header information is that the client 202 is expecting to receive a response from Main Farm Unit 204, rather than from Server A 210*a*. As described in greater detail below, the HTTP response generated by Server A may comprise HTML data which may include one or more URLs corresponding to subordinate Farm Unit A. Additionally, as described in greater detail below, the HTTP response may also comprise cookie file data which includes the session ID corresponding to the client session, and may also include a server instance ID corresponding to the current instance of Server A.

According to at least one embodiment of the present invention, each of the plurality of servers 210 may include substantially similar content. However, each server's content may include different URLs to be provided to clients for enabling a client to access specific data from the host server system 230 via the particular server which provided the URL. For example, where the host server system 230 is configured to facilitate electronic commerce relating to on-line shopping, each of the plurality of servers 210 may include substantially similar content relating to the catalog of products which are available from the on-line merchant. The content stored on each server may differ in that each server may include one or more URLs corresponding to information which is accessible via the particular server on which the URLs reside. Thus, for example, the content on Server A 210*a* may include URLs for accessing content specific to Server A. Similarly, Server B 210*b* may include URLs for accessing content specific to Server B.

According to a specific implementation, the URLs which are included in a client response generated by a particular server correspond to an address of the specific subordinate Farm Unit (of the plurality of subordinate Farm Units 242) associated with the server which generated the client response. For example, when Server A generates a response to a client request, the response may include HTML data having at least one embedded URL. The embedded URL corresponds to an address associated with subordinate Farm Unit A 242*a*. As explained in greater detail below, when the client selects the embedded URL, an HTTP request is sent to subordinate Farm Unit A. As shown in the example of FIG. 2, subordinate Farm Unit A is associated exclusively with Server A, and therefore forwards the received client request to Server A. As described in greater detail below, one advantage of configuring the URLs of a particular server to correspond to an address representing that server's associated subordinate Farm Unit is that it allows the load balancing device 240 to transparently perform fail-over procedures if a failure is detected at any one of the servers 210.

According to a specific embodiment of the present invention, each server of the host server system 230 is configured to process client requests and generate appropriate responses to the requesting clients. Thus, for example, during an electronic commerce session initiated between client 202 and Server A 210*a*, Server A may transmit a response to client 202 comprising HTML data which includes URLs for accessing additional data from Server A. Similarly, during an electronic commerce session initiated between client 202 and Server B 210*b*, Server B would transmit HTML data in response to requests from client 202, wherein the HTML data includes URLs for accessing additional information from Server B. In this way, a "stickiness" scheme may be implemented in the host server system 230 whereby a specific server which is assigned (by the load balancing device 240) to respond to an initial request from a particular client also handles all subsequent requests from that client in order to make optimal use of the state data stored in the server's data cache, thereby resulting in a faster response time of the server system 230.

Returning to FIG. 4A, when the HTTP response is received at the client 202, the cookie file data (which includes the session ID and Server A instance ID) is stored in a cookie file on the client machine. Additionally, the HTML data received from the host server system may be displayed to the client using, for example, a conventional web browser and display screen. At (21) the client submits a subsequent HTTP request to the host server system 230. In the specific example of FIG. 4A, it is assumed that the subsequent HTTP request is generated by the client in response to the client selecting a particular URL embedded within the HTML data displayed to the client. For example, the client may select a particular product to add to the client's electronic shopping cart. In this example, the HTTP request would correspond to an "add to cart" request to be implemented at the host server system. Since the URL selected by the client corresponds to an address of the subordinate Farm Unit A 242*a*, the destination of the HTTP request will be the IP address of the subordinate Farm Unit A. As shown in FIG. 4A, the HTTP request may include data relating to the cookie file stored on the client's machine such as, for example, the client session ID and Server A instance ID.

When the subordinate Farm Unit A receives the subsequent HTTP request from client 202, it forwards (23) the request to Server A. According to a specific embodiment, the load balancing device (240, FIG. 2), which includes subordinate Farm Unit A, does not perform a conventional load balancing procedure for the subsequent packet received from client 202. Since the subsequent client packet (which contains the subsequent HTTP request) was received at subordinate Farm Unit A 242*a* rather than the Main Farm Unit 204, the load balancing unit assumes that a client session has already been initiated between the client 202 and Server A 210*a*. Accordingly, the load balancing device 240 automatically forwards the subsequent client request packet to Server A, provided that a failure is not detected at Server A.

When Server A receives the subsequent HTTP request from client 202, it identifies (25) the session ID from the cookie file data transmitted along with the HTTP request. According to an alternate implementation, the subsequent client request may not include the cookie file data. When the subsequent request is received at Server A, Server A submits a request to the client to retrieve the cookie file data stored on the client machine, including, for example, the session ID and Server A instance ID. Once the cookie file data is received at Server A, the session ID corresponding the electronic commerce session for client 202 may then be identified. After identifying the session ID, Server A processes (27) the subsequent HTTP request. In processing the request, Server A may update and/or retrieve (29) state data relating to the identified session ID from the Data Cache A 250*a* and/or database 220. According to a specific embodiment, customer requests which do not involve a change in the customer state data may be processed by retrieving data from the server's associated data cache. For example, a customer request to display the contents of the customer's electronic shopping cart may be handled by Server A retrieving the appropriate data from the Data Cache A. It will be appreciated that the server does not need to access the database 220 in order to respond to this request. Accordingly, the processing time for responding to the client's request may be significantly reduced. However, if the processing of the client's request results in a change in the client's session and/or application state data (such as, for example, an "add to cart" request), a data write-through operation should preferably be performed, wherein the updated state data for that client is stored in both the data cache 250a and database 220. Once Server A has generated a response to the subsequent client request, it transmits (31) the new response to subordinate Farm Unit A. The response generated by Server A may include updated HTML data, and cookie file data which includes the session ID and Server A instance ID. When the subordinate Farm Unit A receives the response from Server A, it replaces (33) the source IP address of the packet header with the IP address of subordinate Farm Unit A. Thereafter, the subordinate Farm Unit A transmits (35) the HTTP response to the client 202.

As illustrated in the example of FIG. 4A, at (37) it is assumed that a failure occurs at Server A. According to a specific embodiment, the load balancing device 240 may be configured to detect a failure at any one of the plurality of servers 210 by implementing a Server Status Check Procedure such as that shown in FIG. 6 of the drawings.

Figure 6:
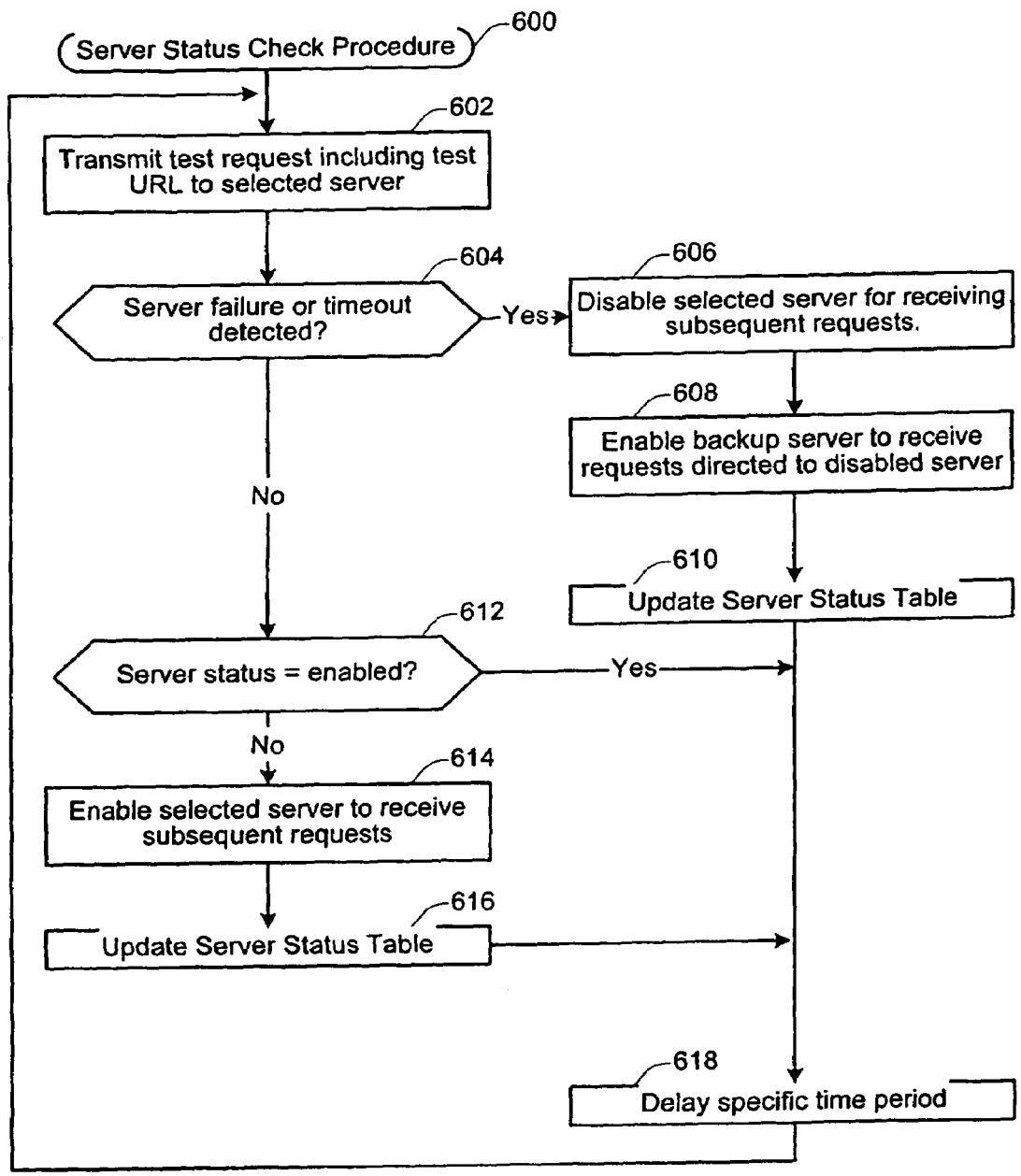
FIG. 6 shows a flow diagram of a Server Status Check Procedure in accordance with a specific embodiment of the present invention.

FIG. 6 shows a flow diagram of a Server Status Check Procedure 600 in accordance with a specific embodiment of the present invention. According to a specific embodiment, a separate instance of the Server Status Check Procedure may be implemented for each server in the host server system 230, thereby allowing the load balancing device to simultaneously check the status of any desired number of servers in the server farm system. According to a specific implementation, the Server Status Check Procedure 600 may be executed at periodic intervals, or at times when the load balancing device is not busy, or may be implemented before the load balancing device forwards a received client request to the appropriate server.

In order to check the status of a selected server, the load balancing device transmits (602) to a selected server a test request (e.g., test HTTP request) which includes a test URL. According to a specific embodiment, the test URL causes the selected server to utilize desired components of the server's technology stack in order to generate a response to the test request. By analyzing and comparing the server's response against a predetermined response corresponding to a healthy server, the load balancing device is able to detect whether there exists a failure at one or more components of the selected server. Accordingly, at 604 a determination is made as to whether a server failure or server timeout has been detected. If a server failure or server timeout has been detected, the selected server is disabled (606) from receiving subsequent requests from any client. Additionally, a backup server is enabled (608) to receive any future requests directed to the disabled server. At 610 a Server Status Table may be updated to reflect the disabled status of the selected server and enabled status of the backup server. According to a specific implementation, the Server Status Table may reside at the load balancing device 240. At 618 the load balancing device may delay a random or predetermined time period before reinitiating the Server Status Check Procedure for the selected server.

Returning to block 604, if a server failure or server timeout is not detected for the selected server, at 612 a determination is made as to whether the status of the selected server reflects that it is enabled to receive client requests. If it is determined that the status of the selected server is enabled, it is assumed that the server is operating properly, and that the server may receive client request packets for processing. If, however, it is determined that the status of the selected server is disabled, it may be assumed that a failure was previously detected at the selected server, and that the selected server is now functioning properly. Accordingly, the status of the selected server is updated to enable (614) the server to receive client request packets for processing. The Server Status Table is then updated (616) to reflect the current status of the selected server.

FIG. 4B shows a specific embodiment of a data flow diagram corresponding to a sequence of events which may be implemented by the present invention in response to detecting a failure at a selected server of the server system 230. The example of FIG. 4B is intended to be a continuation of the example described previously with respect to FIG. 4A.

At (37), it is assumed that a failure occurs at Server A 210a. At (39) the client 202 transmits a subsequent HTTP request to subordinate Farm Unit A 242a. According to a specific implementation, subordinate Farm Unit A represents a logical device which is part of the load balancing device 240 of FIG. 2. At (41) the load balancing device 240 detects (via, for example, the Server Status Check Procedure 600 of FIG. 6) that a failure has occurred at Server A, and chooses a backup or alternate server for servicing the HTTP request received from client 202. According to a specific implementation, the selection of the alternate or backup server may be performed by utilizing a load balancing procedure or protocol which is implemented at the load balancing device 240.

According to a specific embodiment of the present invention, when a backup server takes over an initiated client session for a failed server, the initiated client session will continue at the backup server, even after the failed server subsequently recovers. After the failed server recovers, new client requests may then be directed to the recovered server, whereupon new client sessions will then be initiated.

In the example of FIG. 4B, it is assumed that the load balancing device selects Server B 210b as the alternate or backup server. Accordingly, the load balancing device 240 forwards (43) the client request packet to Server B. When Server B receives the forwarded client request, it identifies (45) the session ID from the cookie file data transmitted by client 202. Server B then attempts to access the state data associated with the electronic commerce session for client 202 from the Data Cache B 250b. However, at this point, the client 202 state information has been stored on Data Cache A 250a, but has not been stored on Data Cache B 250b. Accordingly, Server B will detect (49) a cache miss when attempting to retrieve data relating to the identified session ID from the Data Cache B. In response to detecting a cache miss, each of the plurality of servers 210 may be configured to retrieve session and application state data relating to an identified session ID from the database 220 into its local data cache. Thus, as shown in FIG. 4B, Server B retrieves (51) the session and application state data relating to the client 202 session ID from the database 220, and stores (53) the retrieved session and application state data in the Data Cache B. Thereafter, Server B processes (55) the client request, and stores (57) any updated session and/or application state data (relating to that session ID) in the appropriate state table(s) of the Data Cache B 250b and database 220.

At (59), Server B transmits its response to the client request to the subordinate Farm Unit A, whereupon the subordinate Farm Unit A replaces (61) the source IP address of the packet header with the IP address of subordinate Farm Unit A, and then transmits (63) the HTTP response (generated by Server B) to the client 202.

As stated previously, each response generated by a particular server may include one or more URLs corresponding to an address of the particular subordinate Farm Unit associated with that server. Thus, the response generated by Server B may include at least one URL corresponding to an address associated with subordinate Farm Unit B.

At (65), it is assumed that the client selects one of the URLs provided in the response generated by Server B. The selection of this URL causes the client machine to transmit an appropriate request to subordinate Farm Unit B, whereupon it is then forwarded to Server B for processing in a manner similar to events 23-35, described previously with respect to FIG. 4A.

According to a specific embodiment, Server B will continue to receive and process subsequent request packets from client 202, even after Server A has recovered from its failure and come back on-line. Alternatively, when Server A recovers from its failure, and is detected as functioning normally, Server A may then be enabled to receive subsequent request packets from client 202. However, in this latter situation it is possible for the Data Cache A 250a to have old or erroneous data relating to the current status and/or state of the client 202 electronic commerce session. Accordingly, in order to ensure that Server A uses the most up-to-date state information relating to the client 202 session, a Server Instance ID Verification Procedure may be initiated as described, for example, in FIG. 5 of the drawings.

Figure 5:
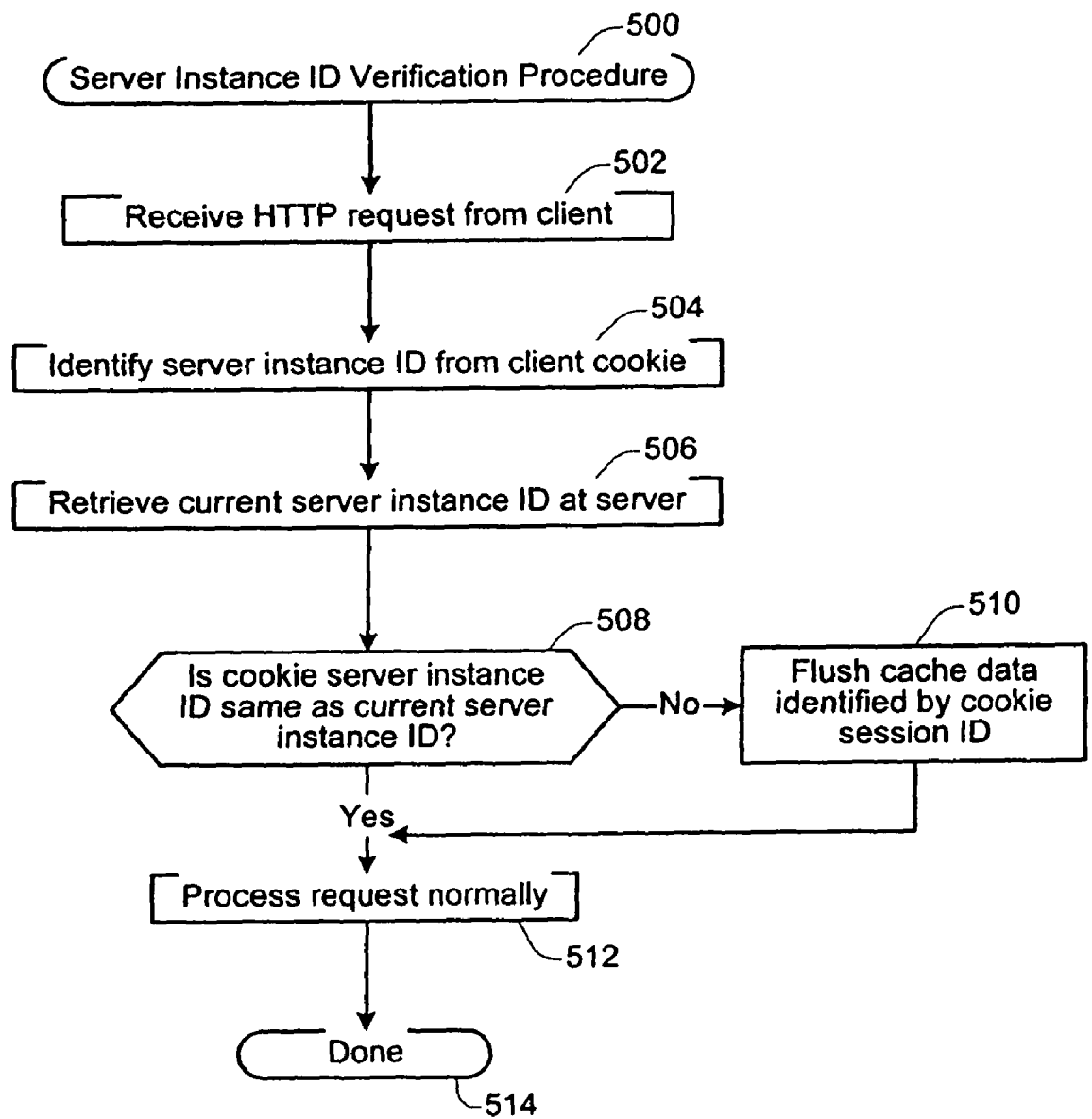
FIG. 5 shows a flow diagram of a Server Instance ID Verification Procedure in accordance with a specific embodiment of the present invention.

FIG. 5 shows a flow diagram of a Server Instance ID Verification Procedure 500 in accordance with a specific embodiment of the present invention. According to a specific embodiment, a separate instance of the Server Instance ID Verification Procedure may be implemented on each of the plurality of servers 210. Further each instance of the Server Instance ID Verification Procedure may be executed at its respective server each time a client request is received at that server.

According to a specific embodiment, each of the plurality of servers 210 has associated with it a unique server instance ID representing the current instance of that particular server session. Each time a server is rebooted or recovers from a failure, the server instance ID associated with that server changes. The current server instance ID may be stored locally at the server, and may also be included in each response generated by that server in response to a client request. The server instance ID transmitted to the client may be stored in the cookie file of the client machine. When the client submits a request to the host server system 230, the request may include cookie file data such as, for example, the server instance ID.

Referring to FIG. 5, at 502 a request is received from a particular client at a specific server of the server farm system. The server identifies (504) the server instance ID from the client cookie data transmitted from the client machine. Additionally, the server retrieves (506) the current server instance ID, which may be stored on the server. A determination is then made (508) as to whether the cookie server instance ID (provided by the client machine) is the same as the current server instance ID (provided by the server). If both server instance IDs are identical, then it may be assumed that the server has not experienced a failure or been rebooted since last communicating with the client, and that the client state data stored in the server's data cache is current and up-to-date. Accordingly, the client request will be processed (512) normally.

However, if it is determined that the cookie server instance ID is not the same as the current server instance ID of the selected server, then it may be assumed that the server has either experienced a failure or been rebooted since last communicating with the requesting client. Accordingly, it is likely that the data in the server's data cache relating to the client's electronic commerce session is not up-to-date. In response, the client state data stored on the server's data cache (which may be identified using the client session ID) is flushed (510). Thereafter, the client request is processed (512) normally as described, for example, with respect to FIG. 4C of the drawings.

FIG. 4C shows a specific embodiment of a data flow diagram which illustrates a sequence of events that may occur after a particular server has been rebooted or has recovered from a failure. The example of FIG. 4C is intended to be a continuation of the example described previously with respect to FIG. 4A.

As shown in FIG. 4C, at (71) it is assumed that Server A recovers from a failure, and is reinitiated with a new server instance ID. At (73), the load balancing device 240 detects that Server A has recovered from its failure, and changes the status of Server A to enable it to again receive client requests. At (75) client 202 submits an HTTP request to subordinate Farm Unit A. Upon receiving the client request, the subordinate Farm Unit A forwards (79) the request to Server A. Server A identifies (80) the session ID and server instance ID from the client cookie file data provided by the client machine. At (81), Server A initiates the Server Instance ID Verification Procedure 500 (FIG. 5), which results in the flushing of data of Data Cache A associated with the identified session ID. At (83), Server A attempts to access the client state data for the identified session ID from Data Cache A, and detects (85) a cache miss. The session and application state data relating to the client session ID is then retrieved (86) from the database 220, and stored (87) in the Data Cache A. Server A then processes (88) the client request, and stores (89) any updated state data relating to the client session in the Cache A 250a and database 220.

At (90), Server A transmits its response to subordinate Farm Unit A, which replaces (91) the source IP address of the response packet header with the IP address of subordinate Farm Unit A, and then transmits (92) the response to the client 202.

Other Embodiments

Generally, the load balanced server farm system of the present invention may be implemented via software and/or hardware. In a specific embodiment of this invention, the technique of the present invention may be implemented in software such as an operating system or in an application running on an operating system.

A software or software/hardware hybrid load balanced server farm system of this invention may be implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. A general architecture for some of these machines will appear from the description given below. In an alternative embodiment, the load balanced server farm system may be implemented on one or more general-purpose network host machines such as a personal computers or workstations. Further, the invention may be at least partially implemented on a card (e.g., an interface card) for a network device or a general-purpose computing device.

Figure 7:
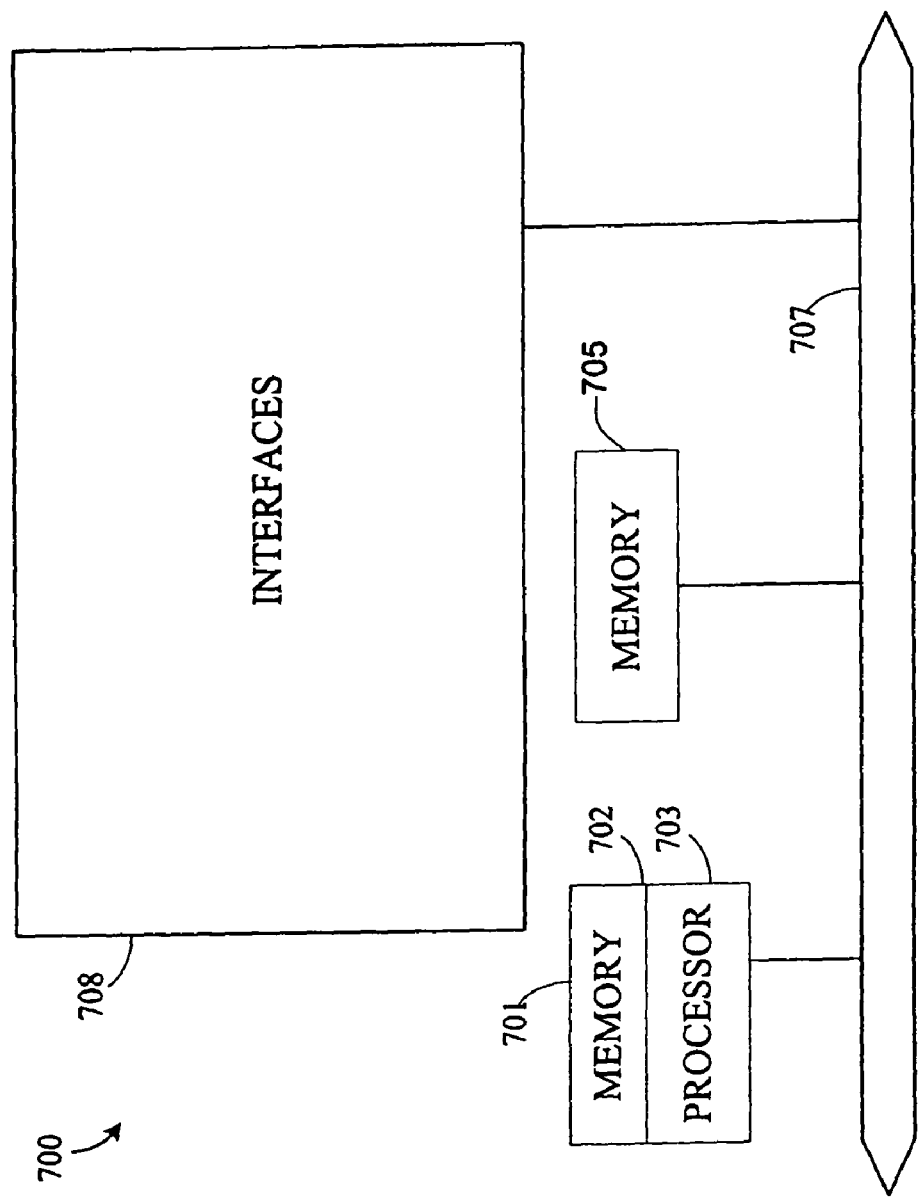
FIG. 7 shows a specific embodiment of a server device suitable for implementing a server of present invention.

Referring now to FIG. 7, a server device 700 suitable for implementing a server of present invention includes a master central processing unit (CPU) 702, one or more interfaces 708, and a bus 707 (e.g., a PCI bus). When acting under the control of appropriate software or firmware, the CPU 702 is responsible for such tasks as processing HTTP requests, dynamically generating HTML data, generating updated session and application state data, accessing data from a data cache and/or persistent memory, etc. It preferably accomplishes all these functions under the control of software including an operating system and any appropriate applications software. CPU 702 may include one or more processors 703 such as a processor from the Motorola family of microprocessors or the Intel family of microprocessors. In an alternative embodiment, processor 703 is specially designed hardware for controlling the operations of the server device 700. In a specific embodiment, a memory 701 (such as non-volatile RAM and/or ROM) also forms part of CPU 702. However, there are many different ways in which memory could be coupled to the system. Memory block 701 may be used for a variety of purposes such as, for example, caching and/or storing client session and application state data, programming instructions, etc.

The load balanced server farm system of the present invention may also employ one or more memories or memory modules (such as, for example, memory block 705) configured to store various data, program instructions, etc. The program instructions may control the operation of an operating system and/or one or more applications. The memory or memories may also be configured to store the various types of data described in this application, such as for example, HTML data, client session and application state data, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

What is claimed is:

1. A computer-implemented method for effecting electronic commerce over a data network, the method comprising:

receiving a block of data from a device;

performing load balancing to assign the initial block of data from the device to a first server of a multi-server system, which includes at least a second server, with the first server supporting a plurality of products available for purchase from an on-line merchant, with the first server using a first data cache and a database, and with the second server using a second data cache and the database, wherein a communication session between the device and the first server is initiated;

storing state data information associated with the communication session in both the first data cache and the database, the state data information being associated with an identifier for the communication session;

generating a response to the block of data at the first server, with the response including state data information associated with the communication session;

transmitting the response to the device;

causing a subsequent block of data received from the device to be routed to the first server, with state data information related to the subsequent block of data stored in both the first data cache and the database, and with such state data information being stored also associated with the communication session, wherein at least a portion of the subsequent block of data is related to purchasing a product from the plurality of products via an electronic shopping cart associated with the communication session;

detecting, by one of the first and the second servers, a cache miss with respect to retrieving state data information associated with the communication session related to the data cache of one of the first and the second servers; and retrieving state data information associated with the communication session from the database and storing such into the data cache of the one of the first and the second servers for use by the one of the first and the second servers, in view of the state data information not being accessible from the data cache of the one of the first and the second servers due to the cache miss, wherein the access time associated with accessing data in the data cache of either the first or the second server is less than the access time associated with accessing the data from the database.

2. A method as recited in claim 1, wherein the first and the second servers include substantially similar content, and wherein the content in each of the first and the second servers includes a plurality of addresses to enable accessing state data information via that server.

3. A method as recited in claim 1 wherein the first server is further configured or designed to provide at least one address specific to the first server to enable accessing state data information via the first server.

4. A method as recited in claim 3 wherein the address is a Uniform Resource Locator.

5. A method as recited in claim 1 wherein a block of data from the device is related to requesting a product to be added to the electronic shopping cart.

6. A method as recited in claim 1, wherein the response includes information related to a server identifier configured to identify a condition of the first server, wherein the subsequent block of data received from the device includes information related to the server identifier, wherein the first server is further configured or designed to compare the information related to the server identifier received from the device with information related to the server identifier accessed from the first server, and wherein the first server is further configured or designed to flush at least a portion of the first data cache due to information related to the server identifier received from the device being different from the information related to the server identifier accessed from the first server.

7. A method as recited in claim 1, wherein the response includes information related to a server identifier configured to identify a condition of the first server, and wherein server identifier accessed from the first server changes if the first server is rebooted or recovers from a failure.

8. A method as recited in claim 1 further comprising:
testing the first server for failure, and
if the first server fails,
    causing a subsequent block of data received from the device to be routed, instead of to the first server, to the second server, and
    retrieving state data information associated to the communication session from the database to be stored in the second data cache for use by the second server.

9. A method as recited in claim 1, wherein the data cache is the first data cache, and the one of the first and the second servers is the first server.

10. A method as recited in claim 1, wherein the data cache is the second data cache, and the one of the first and the second servers is the second server.

11. A non-transitory computer readable medium comprising a plurality of instructions for effecting electronic commerce over a data network, the plurality of instructions, when executed by a computing device, result in the computing device:
    receiving a block of data from a device;
    performing load balancing to assign the initial block of data from the device to a first server of a multi-server system, which includes at least a second server, with the first server supporting a plurality of products available for purchase from an on-line merchant, with the first server using a first data cache and a database, and with the second server using a second data cache and the database, wherein a communication session between the device and the first server is initiated;
    storing state data information associated with the communication session in both the first data cache and the database, the state data information being associated with an identifier for the communication session;
    generating a response to the initial block of data at the first server, with the response including state data information associated with the communication session;
    transmitting the response to the device;
    causing a subsequent block of data received from the device to be routed to the first server, with state data information related to the subsequent block of data stored in both the first data cache and the database, and with such state data information being stored also associated with the communication session, wherein at least a portion of the subsequent block of data is related to purchasing a product from the plurality of products via an electronic shopping cart associated with the communication session;
    detecting, by one of the first and the second servers, a cache miss with respect to retrieving state data information associated with the communication session related to the data cache of one of the first and the second servers; and
    retrieving state data information associated with the communication session from the database and storing such into the data cache of the one of the first and the second servers for use by the one of the first and the second servers, in view of the state data information not being accessible from the data cache of the one of the first and the second servers due to the cache miss,
    wherein the access time associated with accessing data in the data cache of either the first or the second server is less than the access time associated with accessing the data from the database.

12. A non-transitory computer readable medium as recited in claim 11,
    wherein the first and the second servers include substantially similar content, and
    wherein the content in each of the first and the second servers includes a plurality of addresses to enable accessing state data information via that server.

13. A non-transitory computer readable medium as recited in claim 11 wherein the first server is further configured or designed to provide at least one address specific to the first server to enable accessing state data information via the first server.

14. A non-transitory computer readable medium as recited in claim 13 wherein the address is a Uniform Resource Locator.

15. A non-transitory computer readable medium as recited in claim 11 wherein a block of data from the device is related to requesting a product to be added to the electronic shopping cart.

16. A non-transitory computer readable medium as recited in claim 11,
    wherein the response includes information related to a server identifier configured to identify a condition of the first server,
    wherein the subsequent block of data received from the device includes information related to the server identifier,
    wherein the first server is further configured or designed to compare the information related to the server identifier received from the device with information related to the server identifier accessed from the first server, and
    wherein the first server is further configured or designed to flush at least a portion of the first data cache due to information related to the server identifier received from the device being different from the information related to the server identifier accessed from the first server.

17. A non-transitory computer readable medium as recited in claim 11,
    wherein the response includes information related to a server identifier configured to identify a condition of the first server, and
    wherein server identifier accessed from the first server changes if the first server is rebooted or recovers from a failure.

18. A non-transitory computer readable medium as recited in claim 11, wherein the plurality of instructions, when executed by the computing device, further result in the computing device:
    testing the first server for failure, and
    if the first server fails,
        causing a subsequent block of data received from the device to be routed, instead of to the first server, to the second server, and
        retrieving state data information associated to the communication session from the database to be stored in the second data cache for use by the second server.

19. A non-transitory computer readable medium as recited in claim 11, wherein the data cache is the first data cache, and the one of the first and the second servers is the first server.

20. A non-transitory computer readable medium as recited in claim 11, wherein the data cache is the second data cache, and the one of the first and the second servers is the second server.

21. A multi-server system for effecting electronic commerce over a network, the multi-server system comprising:

a load balancing component;

a plurality of servers including a first and a second server, both in communication with the load balancing component, with the first server supporting a plurality of products available for purchase from an on-line store, with the first server including a first data cache, and with the second server including a second data cache; and a database coupled to at least the first and the second server, wherein the multi-server system is configured to:

receive a block of data from a device;

perform load balancing to assign the block of data from the device to the first server, wherein an electronic commerce session between the device and the first server is initiated;

store state data information associated with the electronic commerce session in both the first data cache and the database, the state data information being associated with an identifier for the electronic commerce session;

generate a response to the block of data at the first server, with the response including state data information associated with the electronic commerce session;

transmit the response to the device;

receive a subsequent block of data from the device, wherein at least a portion of the subsequent block of data is related to purchasing a product from the plurality of products via an electronic shopping cart associated with the electric commerce session;

detect, by one of the first and the second servers, a cache miss with respect to retrieving state data information associated with the electronic commerce session related to the data cache of one of the first and the second servers; and retrieve state data information associated with the electronic commerce session from the database and store such into the data cache of the one of the first and the second servers for use by the one of the first and the second servers, in view of the state data information not being accessible from the data cache of the one of the first and the second servers due to the cache miss, wherein accessing at least some of the state data information in the data cache of either the first or the second server takes less time than accessing the at least some of the state data information from the database.

22. The multi-server system of claim 21:

wherein the load balancing component includes a main load balancing device and a plurality of subordinate load balancing, devices, each of the subordinate load balancing devices being associated with a part of the multi-server system; and wherein the plurality of parts comprises a first part which includes a first subordinate load balancing device and the first server, and a second part which includes a second subordinate load balancing device and the second server.

23. The multi-server system of claim 21 wherein the first data cache is configured to store session and application state data relating to the electronic commerce session.

24. The multi-server system of claim 21, wherein each of the first and the second server Includes substantially similar content, and wherein the content in each of the first and the second server includes a respective plurality of Uniform Resource Locators (URLs) for accessing information specific to that server.

25. The multi-server system of claim 21, wherein the first server is configured to provide at least one URL in the response, and wherein the at least one URL corresponds to an address for communicating with the first server.

26. The multi-server system of claim 21, wherein the multi-server system is configured to cause the subsequent block of data received from the device to be routed to the first server, wherein the block of data is received at a main device, which performs the load balancing, and wherein the subsequent block of data is received at a sub device associated with the first server.

27. The multi-server system of claim 21, wherein the multi-server system is configured to cause the subsequent block of data received from the device to be routed to the first server, wherein the block of data is received at a main logical unit, which performs the load balancing, and wherein the subsequent block of data Is received at a subordinate logical unit associated with the first server.

28. The mufti-server system of claim 21 wherein the first server is configured to access state data from the first data cache using state data information associated with the electronic commerce session.

29. The multi-server system of claim 21, wherein the multi-server system is configured to cause the subsequent block of data received from the device to be routed to the first sewer, with state data information related to the subsequent block of data stored in both the first data cache and the database, and with such state data information being stored also associated with the electronic commerce session.

30. The multi-server system of claim 21, wherein the multi-server system Is configured to cause the subsequent block of data received from the device to be routed to the first server, wherein the first server is configured to generate a second response to the subsequent block of data, and wherein the second response includes updated state information relating to the electronic commerce session.

31. The multi-server system of claim 30 wherein the first server is configured to store the updated state information generated by the first server in the first data cache and in the database.

32. The multi-server system of claim 21 wherein the response includes information relating to an instance ID associated with the first server.

33. The multi-server system of claim 32, wherein the multi-sewer system is configured to cause the subsequent block of data received from the device to be routed to the first server, wherein the subsequent block of data received from the device includes the first server instance ID information, wherein the first server is configured to compare the first server instance ID information received from the device with server instance ID information stored at the first server, and wherein the first server is configured to flush at least a portion of the first data cache if the first server instance ID information provided by the device is not equivalent to the server instance ID stored at the first server.

34. The multi-server system of claim 21, wherein the multi-server system is configured to cause the subsequent block of data received from the device to be routed, without performing load balancing, to the first server.

* * * * *

UNITED STATES PATENT AND TRADEMARK OFFICE
CERTIFICATE OF CORRECTION

| | | |
|---|---|---|
| PATENT NO. | : 7,930,416 B2 | |
| APPLICATION NO. | : 12/322745 | |
| DATED | : April 19, 2011 | |
| INVENTOR(S) | : Miller et al. | |

It is certified that error appears in the above-identified patent and that said Letters Patent is hereby corrected as shown below:

IN THE CLAIMS:

Column 15, line 57 (claim 1, line 5) "the initial block" should be -- the block --

Column 16, lines 29-32 (claim 1, lines 43-46) "wherein the access time associated with accessing data in the data cache of either the first or the second server is less than the access time associated with accessing the data from the database." should be -- wherein accessing at least some of the state data information in the data cache of either the first or the second server takes less time than accessing the at least some of the state data information from the database. --

Column 17, line 26 (claim 11, line 7) "the initial block" should be -- the block --

Column 17, line 39 (claim 11, line 20) "the initial block" should be -- the block --

Column 17, lines 64-67 (claim 11, lines 45-48) "wherein the access time associated with accessing data in the data cache of either the first or the second server is less than the access time associated with accessing the data from the database." should be -- wherein accessing at least some of the state data information in the data cache of either the first or the second server takes less time than accessing the at least some of the state data information from the database. --

Column 20, line 30 (claim 28, line 1) "mufti-server" should be -- multi-server --

Column 20, line 36 (claim 29, line 3) "first sewer" should be -- first server --

Column 20, line 57 (claim 33, line 2) "multi-sewer" should be -- multi-server --

Signed and Sealed this
Fifth Day of July, 2011

David J. Kappos
*Director of the United States Patent and Trademark Office*